(12) United States Patent
Meierhoefer et al.

(10) Patent No.: US 10,303,703 B2
(45) Date of Patent: *May 28, 2019

(54) DATA FUSION USING BEHAVIORAL FACTORS

(71) Applicant: comScore, Inc., Reston, VA (US)

(72) Inventors: Cameron S. Meierhoefer, Washington, DC (US); David Pham Kapar, Ashburn, VA (US); Patrick James Kemp, Bethesda, MD (US); Alan Vaughn, Reston, VA (US)

(73) Assignee: comScore, Inc., Reston, VA (US)

( * ) Notice: Subject to any disclaimer, the term of this patent is extended or adjusted under 35 U.S.C. 154(b) by 145 days.

This patent is subject to a terminal disclaimer.

(21) Appl. No.: 14/485,898

(22) Filed: Sep. 15, 2014

(65) Prior Publication Data

US 2015/0006559 A1    Jan. 1, 2015

Related U.S. Application Data

(63) Continuation of application No. 13/222,647, filed on Aug. 31, 2011, now Pat. No. 8,838,601.

(51) Int. Cl.
*G06F 7/00* (2006.01)
*G06F 17/30* (2006.01)
(Continued)

(52) U.S. Cl.
CPC .......... *G06F 16/284* (2019.01); *G06F 16/00* (2019.01); *G06Q 30/0203* (2013.01); *G06Q 30/0241* (2013.01); *H04L 67/10* (2013.01)

(58) Field of Classification Search
None
See application file for complete search history.

(56) References Cited

U.S. PATENT DOCUMENTS 7,181,438 B1    2/2007  Szabo
7,630,986 B1 *  12/2009 Herz et al.
(Continued)

OTHER PUBLICATIONS

Tony's Teaching & Learning, https://tonyteaching.wordpress.com/2009/02/18/to-create-survey-form/, Feb. 18, 2009 (Year: 2009).*

(Continued)

*Primary Examiner* — Robert W Beausoliel, Jr.
*Assistant Examiner* — Hau Hoang
(74) *Attorney, Agent, or Firm* — Baker & Hostetler LLP

(57) ABSTRACT

A first data set associated with a first group of users is accessed. The first data set includes demographic data, online behavior data, and additional user data associated with the users in the first group. A second data set associated with a second group of users is accessed. The second data set includes demographic data and online behavior data but not additional user data associated with the users in the second group. One or more sets of matched users are determined based on the demographic data and online behavior data included in the first data set and the demographic data and online behavior data included in the second data set. Each set includes a user from the first group matched with a user from the second group. Based on the one or more sets of matched users, an augmented second data set that includes additional user data associated with the users in the second group is generated. One or more reports are generated based on the augmented second data set.

20 Claims, 11 Drawing Sheets

(51) Int. Cl.
  *G06F 16/28* (2019.01)
  *G06F 16/00* (2019.01)
  *G06Q 30/02* (2012.01)
  *H04L 29/08* (2006.01)

(56) References Cited

U.S. PATENT DOCUMENTS

| | | | |
|---|---|---|---|
| 7,698,345 B2* | 4/2010 | Samson et al. | 707/780 |
| 2003/0028451 A1* | 2/2003 | Ananian | 705/27 |
| 2003/0097300 A1 | 5/2003 | Gutta | |
| 2003/0105660 A1 | 6/2003 | Walsh | |
| 2004/0098744 A1* | 5/2004 | Gutta | 725/46 |
| 2007/0088720 A1* | 4/2007 | Neuneier et al. | 707/100 |
| 2007/0156677 A1 | 7/2007 | Szabo | |
| 2008/0215602 A1* | 9/2008 | Samson et al. | 707/101 |
| 2008/0288889 A1* | 11/2008 | Hunt et al. | 715/810 |
| 2008/0319829 A1* | 12/2008 | Hunt et al. | 705/10 |
| 2009/0006156 A1* | 1/2009 | Hunt et al. | 705/7 |
| 2009/0024546 A1* | 1/2009 | Ficcaglia et al. | 706/12 |
| 2010/0082367 A1* | 4/2010 | Hains et al. | 705/2 |
| 2010/0138282 A1 | 6/2010 | Kannan | |
| 2011/0004682 A1* | 1/2011 | Honnold et al. | 709/224 |
| 2011/0016058 A1* | 1/2011 | Pinchuk | 705/348 |
| 2011/0087780 A1* | 4/2011 | McCann et al. | 709/225 |
| 2013/0091001 A1* | 4/2013 | Jia et al. | 705/14.25 |

OTHER PUBLICATIONS

HTML Form Software, http://www.createsurvey.com/articles/html_form_software.htm, Oct. 18, 2006 (Year: 2006).*

Notification of Transmittal of the International Search Report and the Written Opinion of the International Searching Authority, or the Declaration issued in PCT/US2012/0053385 on Nov. 16, 2012, 10 pages.

Notification Concerning Transmittal of International Preliminary Report on Patentability issued in PCT/US2012/0053385 on Mar. 13, 2014, 9 pages.

Office Action issued in U.S. Appl. No. 13/222,647 on Aug. 26, 2013, 14 pages.

Notice of Allowance issued in U.S. Appl. No. 13/222,647 on May 28, 2014, 7 pages.

* cited by examiner

DATA FUSION USING BEHAVIORAL FACTORS

CROSS-REFERENCE TO RELATED APPLICATION

This application is a continuation of U.S. application Ser. No. 13/222,647, filed Aug. 31, 2011, the contents of which is incorporated by reference

BACKGROUND

Internet audience measurement may be useful for a number of reasons. For example, some organizations may want to be able to make claims about the size and growth of their audiences or technologies. Similarly, understanding consumer behavior, such as how consumers interact with a particular web site or group of web sites, may help organizations make decisions that improve their traffic flow or the objective of their site. In addition, understanding Internet audience visitation and habits may be useful in supporting advertising planning, buying, and selling.

SUMMARY

In one aspect, a system includes one or more processing devices and one or more storage devices storing instructions. The instructions, when executed by the one or more processing devices, cause the one or more processing devices to access a first data set associated with a first group of users. The first data set includes demographic data, online behavior data, and additional user data associated with the users in the first group. The instructions also cause the one or more processing devices to access a second data set associated with a second group of users. The second data set including demographic data and online behavior data but not additional user data associated with the users in the second group. Further, the instructions cause the one or more processing devices to determine one or more sets of matched users based on the demographic data and online behavior data included in the first data set and the demographic data and online behavior data included in the second data set. Each set includes a user from the first group matched with a user from the second group. The instructions also cause the one or more processing devices to generate, based on the one or more sets of matched users, an augmented second data set that includes additional user data associated with the users in the second group. Additionally, the instructions cause the one or more processing devices to generate one or more reports based on the augmented second data set.

Implementations may include one or more of the following features. For example, the instructions that, when executed by the one or more processing devices, cause the one or more processing devices to generate the one or more reports may include instructions that, when executed by the one or more processing devices, cause the one or more processing devices to generate one or more reports based on the first data set and the augmented second data set. The instructions that, when executed by the one or more processing devices, cause the one or more processing devices to determine one or more sets of matched users may include instructions that, when executed by the one or more processing devices, cause the one or more processing devices to group users in the first group and users in the second group into one or more subsets based on the demographic data included in the first data set and the demographic data included in the second data set.

The instructions that, when executed by the one or more processing devices, cause the one or more processing devices to group users in the first group and users in the second group into one or more subsets may include instructions that, when executed by the one or more processing devices, cause the one or more processing devices to compare demographic data included in the first data set and the demographic data included in the second data set. The instructions that, when executed by the one or more processing devices, cause the one or more processing devices to group users in the first group and users in the second group into one or more subsets may further include instructions that, when executed by the one or more processing devices, cause the one or more processing devices to determine, based on the comparison between the demographic data included in the first data set and the demographic data included in the second data set, that demographic data associated with a first user in the first group matches demographic data associated with a second user in the second group. The instructions that, when executed by the one or more processing devices, cause the one or more processing devices to group users in the first group and users in the second group into one or more subsets may further include instructions that, when executed by the one or more processing devices, cause the one or more processing devices to group the user in the first group and the user in the second group into a subset.

The instructions that, when executed by the one or more processing devices, cause the one or more processing devices to determine one or more sets of matched users may include instructions that, when executed by the one or more processing devices, cause the one or more processing devices to match a first user in the first group with a second user in the second group based on the online behavior data included in the first data set and the online behavior data included in the second data set, the user in the first group and the user in the second group having been grouped in the same subset.

The instructions that, when executed by the one or more processing devices, cause the one or more processing devices to match the first user in the first group with the second user in the second group based on the online behavior data included in the first data set and the online behavior data included in the second data set may include instructions that, when executed by the one or more processing devices, cause the one or more processing devices to create a vector of online behavior data for each user from the first group grouped in the subset and for each user from the second group grouped into the subset. The instructions that, when executed by the one or more processing devices, cause the one or more processing devices to match the first user in the first group with the second user in the second group may further include instructions that, when executed by the one or more processing devices, cause the one or more processing devices to determine a distance between the vector created for the second user and each of the vectors created for the users from the first group grouped in the subset. The instructions that, when executed by the one or more processing devices, cause the one or more processing devices to match the first user in the first group with the second user in the second group may further include instructions that, when executed by the one or more processing devices, cause the one or more processing devices to determine that the distance between the vector created for the first user and the vector created for the second user is smaller than the distances between the vector created for the second user and the other users from the first group grouped in the subset.

The instructions that, when executed by the one or more processing devices, cause the one or more processing devices to match the first user in the first group with the second user in the second group may further include The instructions that, when executed by the one or more processing devices, cause the one or more processing devices to match the first user with the second user in response to determining that the distance between the vector created for the first user and the vector created for the second user is smaller than the distances between the vector created for the second user and the other users from the first group grouped in the subset.

The instructions that, when executed by the one or more processing devices, cause the one or more processing devices to determine a distance between the vector created for the second user and each of the vectors created for the users from the first group grouped in the subset may include instructions that, when executed by the one or more processing devices, cause the one or more processing devices to determine a Mahalanobis distance between the vector created for the second user and each of the vectors created for the users from the first group grouped in the subset. The additional user data included in the first data set includes survey data associated with one or more users in the first group.

In another aspect, a method includes accessing a first data set associated with a first group of users. The first data set includes demographic data, online behavior data, and additional user data associated with the users in the first group. The method further includes accessing a second data set associated with a second group of users. The second data set includes demographic data and online behavior data but not additional user data associated with the users in the second group. The method includes determining one or more sets of matched users based on the demographic data and online behavior data included in the first data set and the demographic data and online behavior data included in the second data set. Each set includes a user from the first group matched with a user from the second group. The method also includes generating, based on the one or more sets of matched users, an augmented second data set that includes additional user data associated with the users in the second group. Further, the method includes generating one or more reports based on the first data set and the augmented second data set.

Implementations may include one or more of the following features. For example, generating the one or more reports may include generating one or more reports based on the first data set and the augmented second data set. Determining one or more sets of matched users may include grouping users in the first group and users in the second group into one or more subsets based on the demographic data included in the first data set and the demographic data included in the second data set.

Grouping users in the first group and users in the second group into one or more subsets may include comparing demographic data included in the first data set and the demographic data included in the second data set. Grouping users in the first group and users in the second group into one or more subsets may further include determining, based on the comparison between the demographic data included in the first data set and the demographic data included in the second data set, that demographic data associated with a first user in the first group matches demographic data associated with a second user in the second group. Grouping users in the first group and users in the second group into one or more subsets may further include grouping the user in the first group and the user in the second group into a subset.

Determining one or more sets of matched users may include matching a first user in the first group with a second user in the second group based on the online behavior data included in the first data set and the online behavior data included in the second data set, the user in the first group and the user in the second group having been grouped in the same subset.

Matching the first user in the first group with the second user in the second group based on the online behavior data included in the first data set and the online behavior data included in the second data set may include creating a vector of online behavior data for each user from the first group grouped in the subset and for each user from the second group grouped into the subset. Matching the first user in the first group with the second user in the second group may further include determining a distance between the vector created for the second user and each of the vectors created for the users from the first group grouped in the subset. Matching the first user in the first group with the second user in the second group may further include determining that the distance between the vector created for the first user and the vector created for the second user is smaller than the distances between the vector created for the second user and the other users from the first group grouped in the subset. Matching the first user in the first group with the second user in the second group may further include matching the first user with the second user in response to determining that the distance between the vector created for the first user and the vector created for the second user is smaller than the distances between the vector created for the second user and the other users from the first group grouped in the subset.

Determining a distance between the vector created for the second user and each of the vectors created for the users from the first group grouped in the subset may include determining a Mahalanobis distance between the vector created for the second user and each of the vectors created for the users from the first group grouped in the subset. The additional user data included in the first data set includes survey data associated with one or more users in the first group.

In another aspect, a system includes one or more processing devices and one or more storage devices storing instructions. The instructions, when executed by the one or more processing devices, cause the one or more processing devices to access a first set of demographic data for a first group of client systems. The first set of demographic data is determined based on survey data collected from each member of the first group of client systems. The instructions also cause the one or more processing devices to access a second set of demographic data for a second group of client systems. The second set of demographic data is determined based on profile data associated with each member of the second group of client systems. The instructions also cause the one or more processing devices to compare the first set of demographic data with the second set of demographic data. Further, the instructions cause the one or more processing devices to, based on the comparison of the first set of demographic data with the second set of demographic data, group, into subsets, one or more members of the first group of client systems with one or more members of the second group of client systems such that members of each subset share matching demographic data. The instructions also cause the one or more processing devices to access online behavior data for each member of a subset. In addition, the instructions cause the one or more processing devices to compare online behavior data of each member of the subset with online behavior data of the other members of the subset. The instructions also cause the one or more processing devices to, based on the comparison the online behavior data of each member of the subset with online behavior data of the other members of the subset, associate, within the subset, each member of the second group of client systems with a member of the first group of client systems. The instructions also cause the one or more processing devices to, for each member of the second group of client systems within the subset, associate survey data collected from the member of the first group of client systems with the member of the second group of client systems with whom the member of the first group of client systems has been associated. The instructions also cause the one or more processing devices to generate one or more reports based on the association of survey data.

Implementations may include one or more of the following features. For example, the instructions that, when executed by the one or more processing devices, cause the one or more processing devices to compare the first set of demographic data with the second set of demographic data may include instructions that, when executed by the one or more processing devices, cause the one or more processing devices to determine that a first client system from the first group of client systems share one or more of the following demographic variables with a second client system from the second group of client systems: age, gender, zip code, income, race, ethnicity, whether there are children present in a household associated with the client system, and the size of the household associated with the client system. The instructions that, when executed by the one or more processing devices, cause the one or more processing devices to group, into subsets, one or more members of the first group of client systems with one or more members of the second group of client systems such that members of each subset share matching demographic data may include instructions that, when executed by the one or more processing devices, cause the one or more processing devices to group the first client system from the first group of client systems and the second client system from the second group of client systems into one of the subsets.

The instructions that, when executed by the one or more processing devices, cause the one or more processing devices to compare online behavior data of each member of the subset with online behavior data of the other members of the subset may include instructions that, when executed by the one or more processing devices, cause the one or more processing devices to create a vector of online behavior data for each client system from the first group grouped in a first subset and for each client system from the second group grouped into the first subset, the first group grouped in the first subset including a first client system and the second group grouped in the first subset including a second client system. The instructions that, when executed by the one or more processing devices, cause the one or more processing devices to compare online behavior data of each member of the subset with online behavior data of the other members of the subset may further include instructions that, when executed by the one or more processing devices, cause the one or more processing devices to determine a distance between the vector created for the second client system and each of the vectors created for the client systems from the first group grouped in the first subset, and to determine that the distance between the vector created for the first client system and the vector created for the second client system is smaller than the distances between the vector created for the second client system and the other client systems from the first group grouped in the first subset.

The instructions that, when executed by the one or more processing devices, cause the one or more processing devices to associate, within the subset, each member of the second group of client systems with a member of the first group of client systems may include instructions that, when executed by the one or more processing devices, cause the one or more processing devices to match the first client system with the second client system in response to determining that the distance between the vector created for the first client system and the vector created for the second client system is smaller than the distances between the vector created for the second client system and the other client systems from the first group grouped in the first subset.

The instructions that, when executed by the one or more processing devices, cause the one or more processing devices to generate one or more reports based on the association of survey data may include instructions that, when executed by the one or more processing devices, cause the one or more processing devices to receive one or more target audience variables that are based on the survey data and to search data associated with the first group of client systems and the second group of client systems for the one or more target audience variables. The instructions that, when executed by the one or more processing devices, cause the one or more processing devices to generate one or more reports based on the association of survey data may further include instructions that, when executed by the one or more processing devices, cause the one or more processing devices to generate a report that includes the online behavior data associated with the members of the first group of client systems and the members of the second group of client systems that are associated with survey data that matches the one or more target audience variables.

The instructions that, when executed by the one or more processing devices, cause the one or more processing devices to associate, within the subset, each member of the second group of client systems with a member of the first group of client systems may include instructions that, when executed by the one or more processing devices, cause the one or more processing devices to determine the distances between each of the vectors created for the client systems from the second group grouped in the first subset and each of the vectors created for the client systems from the first group grouped in the first subset, and determine that the vector created for a third client system from the first group grouped in the first subset is greater in distance than a vector created for at least one other client system from the first group grouped in the first subset to each of the client systems from the second group grouped in the first subset.

The instructions that, when executed by the one or more processing devices, cause the one or more processing devices to associate, within the subset, each member of the second group of client systems with a member of the first group of client systems may further include instructions that, when executed by the one or more processing devices, cause the one or more processing devices to determine a distance between the vector created for the third client system and each of the vectors created for the client systems from the second group grouped in the first subset and to determine that the distance between the vector created for the third client system and a vector created for a fourth client system from the second group grouped in the first subset is smaller than the distances between the vector created for the third client system and the other client systems from the second group grouped in the first subset.

The instructions that, when executed by the one or more processing devices, cause the one or more processing devices to associate, within the subset, each member of the second group of client systems with a member of the first group of client systems may include instructions that, when executed by the one or more processing devices, cause the one or more processing devices to match the third client system with the fourth client system in response to determining that the distance between the vector created for the third client system and the vector created for the fourth client system is smaller than the distances between the vector created for the third client system and the other client systems from the second group grouped in the first subset Implementations of any of the described techniques may include a method or process, an apparatus, a device, a machine, a system, or instructions stored on a computer-readable storage device. The details of particular implementations are set forth in the accompanying drawings and description below. Other features will be apparent from the following description, including the drawings, and the claims.

DETAILED DESCRIPTION

In general, webpage or other resource accesses by client systems may be recorded, and those accesses may be analyzed to develop audience measurement reports. Data about resource accesses can be collected using a panel-based approach, in which a monitoring application is installed on the client systems of a panel of users to collect information about the users' web accesses, or using a beacon-based approach, in which script or other code is associated with the resource being accessed such that the code is executed when a client system renders the resource and collects the users' access information. In some cases, both approaches may be employed.

Whether used separately or in combination, the panel-based data and the beacon-based data may provide valuable information about the users' resource accesses. However, resource access data alone can sometimes provide an incomplete picture about a user's intent, affinity, or offline behavior. Combining the resource access data with information indicative of a user's intent, affinity, or offline behavior may therefore, at times, provide a more complete and informative audience measurement report. Information indicative of a user's intent, affinity, or offline behavior can be obtained in a number of ways, including, for example, through the collection of survey data from members of the panel of users.

However, the users from whom detailed survey data can be collected may be a subset, or may be completely different, of users for whom sufficient panel-based and/or beacon-based data can be collected are not always the same users from whom detailed survey data can be collected. Nonetheless, information collected from those users who submit detailed survey data may be attributed to the users for whom sufficient panel-based data and beacon-based data can be collected through a data fusion process. Application of the data fusion process may, among other things, provide the basis for more detailed audience measurement reports. The following describes examples of systems for collecting panel-based and/or beacon-based data about resource accesses and for collecting additional user data such as survey data, and examples of techniques for fusing the resource access data with the additional user data to generate audience measurement reports.

Figure 1:
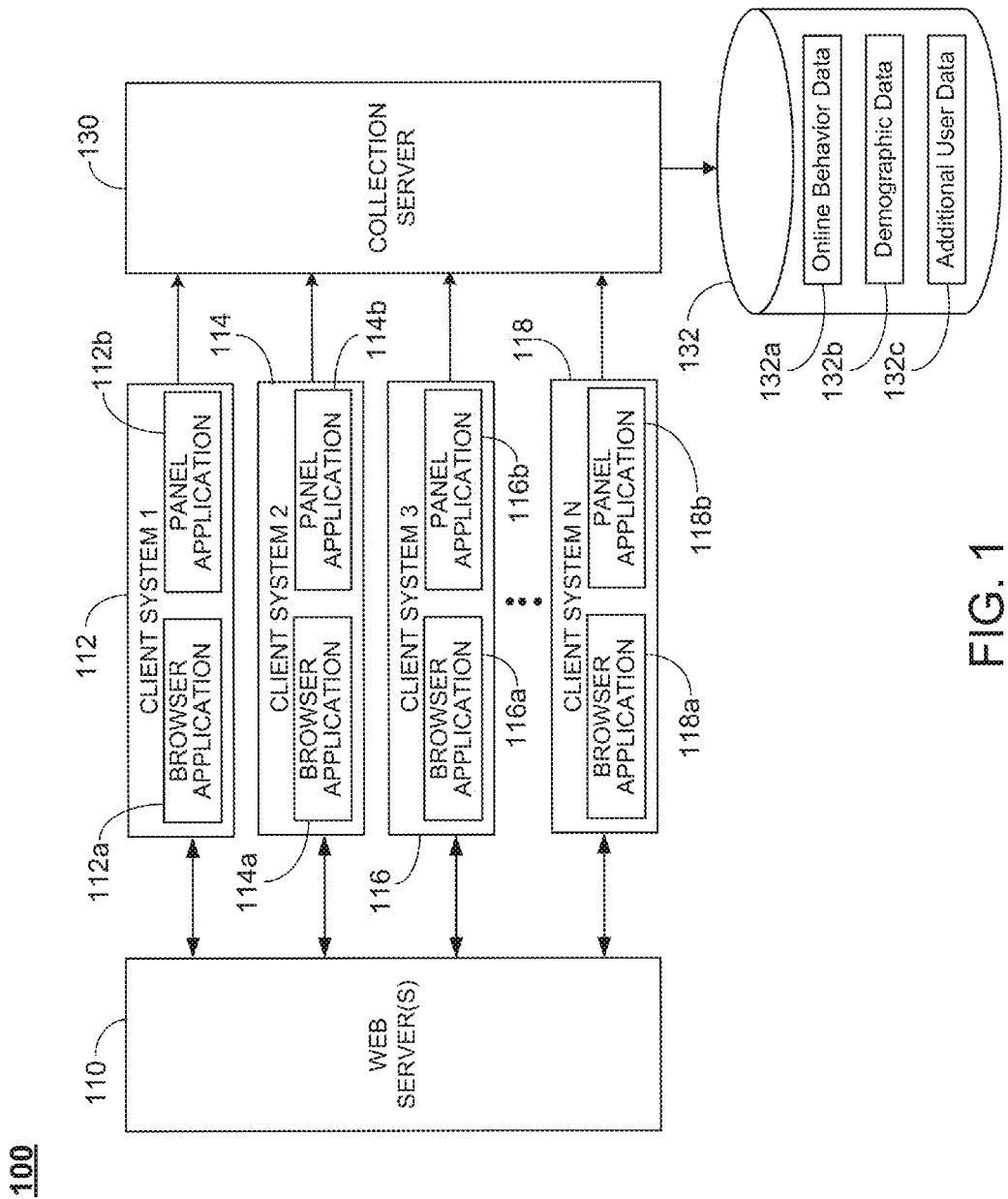
FIG. 1 illustrates an example of a system in which a panel of users may be used to collect data for Internet audience measurement.

FIG. 1 illustrates an example of a system 100 in which a panel of users may be used to collect data for Internet audience measurement. The system 100 includes client systems 112, 114, 116, and 118, one or more web servers 110, a collection server 130, and a datastore, such as a database 132. In general, the users in the panel employ client systems 112, 114, 116, and 118 to access resources on the Internet, such as webpages located at the web servers 110. Information about this resource access is sent by each client system 112, 114, 116, and 118 from panel applications 112b, 114b, 116b, and 118b to a collection server 130. This online behavior data 132a may be used to understand the usage habits of the users of the Internet.

In addition to the online behavior data 132a, the datastore 132 may store demographic data 132b about the users of client systems 112, 114, 116, 118 and additional user data 132c about those users. The demographic data 132b may include basic information about the user such as the user's age, sex, household size, household composition, geographic region, number of client systems, and household income. The demographic data 132b may be obtained from in a number of different ways. For example, the user may provide the demographic data 132b during an initial registration process prior to downloading the panel application to his or her client system. Alternatively, or additionally, the demographic data 132b may be obtained through the use of a survey presented to the user on his or her client system. The survey may be sent to the client system by a web server 110 or a collection server 130 and presented to the user via the browser application. In other cases, the survey may be stored on the client system and presented to the user via the panel application, or may be sent to the user by e-mail. The survey may be presented to the user once or multiple times on a periodic or aperiodic basis. Additionally, each survey may be presented to the entire panel of users or to a subset of the users within the panel.

The additional user data 132c is more detailed information about users in the panel. Additional user data 132c may include information about the affinity, intent, or offline behavior of the user in the panel. For example, the additional user data 132c may indicate whether the user has been to movies in last six months, whether the user is a home owner, or whether the user is a car owner. The additional user data 132c may be collected through a survey similar to the one described above with regard to the demographic data 132*b*, and may be collected as part of the same survey in which demographic data is collected. For example, demographic data for the users in the panel may be collected during the initial registration process, and a subset of the users in the panel may be provided with a survey that collects demographic and additional user data. In this case, there may be demographic data and additional user data for a subset of the users based on the survey, and only demographic data for the rest of the users based on the registration. The additional user data 132*c* may be collected in other manners, such as through an analysis of a user's online behavior data.

Each of the client systems 112, 114, 116, and 118, the collection server 130, and the web servers 110 may be implemented using, for example, a general-purpose computer capable of responding to and executing instructions in a defined manner, a personal computer, a special-purpose computer, a workstation, a server, or a mobile device. Client systems 112, 114, 116, and 118, collection server 130, and web servers 110 may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by a client system 112, 114, 116, and 118, collection server 130, and web servers 110.

In the example shown in FIG. 1, the system 100 includes client systems 112, 114, 116, and 118. However, in other implementations, there may be more or fewer client systems. Similarly, in the example shown in FIG. 1, there is a single collection server 130. However, in other implementations there may be more than one collection server 130. For example, each of the client systems 112, 114, 116, and 118 may send data to more than one collection server for redundancy. In other implementations, the client systems 112, 114, 116, and 118 may send data to different collection servers. In this implementation, the data, which represents data from the entire panel, may be communicated to and aggregated at a central location for later processing. The central location may be one of the collection servers.

The users of the client systems 112, 114, 116, and 118 are a group of users that are a representative sample of the larger universe being measured, such as the universe of all Internet users or all Internet users in a geographic region. To understand the overall behavior of the universe being measured, the behavior from this sample is projected to the universe being measured. The size of the universe being measured and/or the demographic composition of that universe may be obtained, for example, using independent measurements or studies. For example, enumeration studies may be conducted monthly (or at other intervals) using random digit dialing.

Similarly, the client systems 112, 114, 116, and 118 are a group of client systems that are a representative sample of the larger universe of client systems being used to access resources on the Internet. As a result, the behavior on a machine basis, rather than person basis, can also be, additionally or alternatively, projected to the universe of all client systems accessing resources on the Internet. The total universe of such client systems may also be determined, for example, using independent measurements or studies.

The users in the panel may be recruited by an entity controlling the collection server 130, and the entity may collect various demographic information as described above with regard to demographic data 132*b*. The techniques used to recruit users may be chosen or developed to help insure that a good random sample of the universe being measured is obtained, biases in the sample are minimized, and the highest manageable cooperation rates are achieved. Once a user is recruited, a monitoring application is installed on the user's client system. The monitoring application collects the information about the user's use of the client system to access resources on the Internet and sends that information to the collection server 130.

For example, the monitoring application may have access to the network stack of the client system on which the monitoring application is installed. The monitoring application may monitor network traffic to analyze and collect information regarding requests for resources sent from the client system and subsequent responses. For instance, the monitoring application may analyze and collect information regarding HTTP requests and subsequent HTTP responses.

Thus, in system 100, a monitoring application 112*b*, 114*b*, 116*b*, and 118*b*, also referred to as a panel application, is installed on each of the client systems 112, 114, 116, and 118. Accordingly, when a user of one of the client systems 112, 114, 116, or 118 employs, for example, a browser application 112*a*, 114*a*, 116*a*, or 118*a* to visit and view web pages, information about these visits may be collected and sent to the collection server 130 by the monitoring application 112*b*, 114*b*, 116*b*, and 118*b*. For instance, the monitoring application may collect and send to the collection server 130 the URLs of web pages or other resources accessed, the times those pages or resources were accessed, and an identifier associated with the particular client system on which the monitoring application is installed (which may be associated with the demographic information collected regarding the user or users of that client system). For example, a unique identifier may be generated and associated with the particular copy of the monitoring application installed on the client system. The monitoring application also may collect and send information about the requests for resources and subsequent responses. For example, the monitoring application may collect the cookies sent in requests and/or received in the responses. The collection server 130 receives and records this information. The collection server 130 aggregates the recorded information from the client systems and stores this aggregated information in the database 132 as online behavior data 132*a*.

The online behavior data 132*a* may be analyzed to determine the visitation or other habits of users in the panel, which may be extrapolated to the larger population of all Internet users. The information collected during a particular usage period (session) can be associated with a particular user of the client system (and/or his or her demographic data 132*b*) that is believed or known to be using the client system during that time period. For example, the monitoring application may require the user to identify his or herself, or techniques such as those described in U.S. Patent Application No. 2004-0019518 or U.S. Pat. No. 7,260,837, both incorporated herein by reference, may be used. Identifying the individual using the client system may allow the usage information to be determined and extrapolated on a per person basis, rather than a per machine basis. In other words, doing so allows the measurements taken to be attributable to individuals across machines within households, rather than to the machines themselves.

To extrapolate the usage of the panel members to the larger universe being measured, some or all of the members of the panel are weighted and projected to the larger universe. In some implementations, a subset of all of the members of the panel may be weighted and projected. For instance, analysis of the received data may indicate that the online behavior data collected from some members of the panel may be unreliable. Those members may be excluded from reporting and, hence, from being weighted and projected.

Additionally, the client systems 112, 114, 116, and 118 may collect and send demographic data and additional user data about each of the panel members to the collection server 130. For example, either the browser applications 112*a*, 114*a*, 116*a*, and 118*a* or panel applications 112*b*, 114*b*, 116*b*, and 118*b* may collect and send the demographic data and additional user data. Generally, some demographic data is collected for each of the members of the panel. Therefore, even when only a subset of all of the members of the panel are weighted and projected, each member of the subset will be associated with a set of demographic data. However, not all members of the panel may have additional user data associated with them. As described above, the additional user data may be collected by survey. The collection server 130 aggregates the collected demographic data and additional user data from the client systems and stores this aggregated information in the database 132 as demographic data 132*b* and additional user data 132*c*. For the aggregated online behavior data 132*a*, demographic data 132*b*, and additional user data 132*c*, the collection server 130 retains an association to the panel member or client system from which the data was received.

Unfortunately, it is possible that only a subset of the members of the panel respond to these surveys or, in some cases, surveys may only be sent to a subset of the panel. The subset of panel members for whom reliable online behavior data is collected and the subset of panel members for whom additional user data has been collected may not perfectly overlap. Therefore, there will be panel members who may be included in reporting that are associated with a set of demographic data but not with any additional user data.

Associating each panel member with a set of additional user data may provide more comprehensive audience measurement reports. For example, this may allow the reports to not only be indexed based on basic demographic data, but also more detailed indices. In order to associate each member included in reporting with a set of additional user data, even where each user has not provided such data, the subset of panel members for whom reliable online behavior data is collected may be matched with the subset of panel members for whom additional user data has been collected. As will be explained in greater detail below with regard to FIGS. 4 and 5, a fusion process may be implemented to match members of each subset based on a combination of demographic data and online behavior data and attribute additional user data to each panel member who will be included in reporting.

The reporting sample of users (those included in the weighting and projection) are weighted to insure that the reporting sample reflects the demographic composition of the universe of users to be measured, and this weighted sample is projected to the universe of all users. This may be accomplished by determining a projection weight for each member of the reporting sample and applying that projection weight to the usage of that member. Similarly, a reporting sample of client systems may be projected to the universe of all client systems by applying client system projection weights to the usage of the client systems. The client system projection weights are generally different from the user projection weights.

The usage behavior of the weighted and projected sample (either user or client system) may then be considered a representative portrayal of the behavior of the defined universe (either user or client system, respectively). Behavioral patterns observed in the weighted, projected sample may be assumed to reflect behavioral patterns in the universe.

Estimates of visitation or other behavior can be generated from this information. For example, this data may be used to estimate the number of unique visitors (or client systems) visiting certain web pages or groups of web pages, or unique visitors within a particular demographic (based, for instance, on the demographic and additional user data associated the panel members) visiting certain web pages or groups of web pages. This data may also be used to determine other estimates, such as the frequency of usage per user (or client system), average number of pages viewed per user (or client system), and average number of minutes spent per user (or client system).

A panel-based approach, however, is not the only method for collecting online behavior data, demographic data, and additional user data from client systems. As described below, with regard to FIG. 2, this data may additionally or alternatively be collected though a beacon-based approach. In one implementation, data collected from both the panel-based and beacon-based approaches may be combined to further improve the accuracy of the audience measurement reports.

Figure 2:
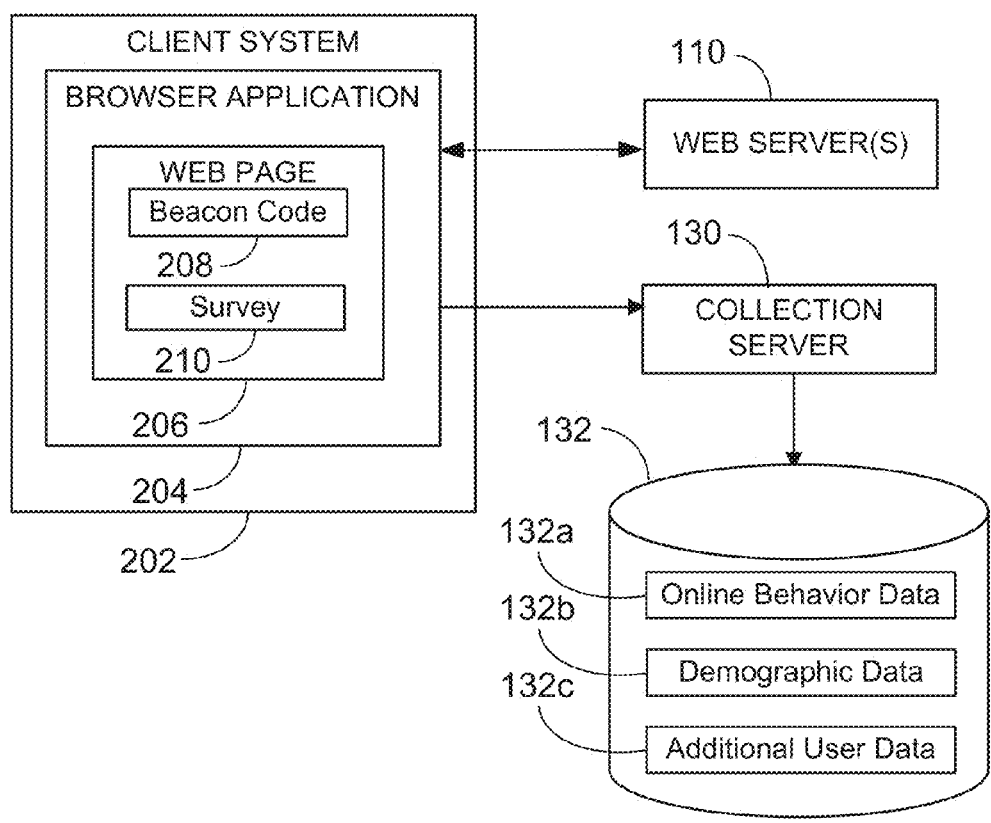
FIG. 2 illustrates an example of a system in which beacon data may be used collect data for Internet audience measurement.

Referring to FIG. 2, a beacon-based approach may be implemented using a system 200. In general, a beacon-based approach may entail including beacon code in one or more web pages.

System 200 includes one or more client systems 202, the web servers 110, the collection servers 130, and the database 132. The client systems 202 can include client systems 112, 114, 116, or 118, which have the panel application installed on them, as well as client systems that do not have the panel application installed.

The client systems include a browser application 204 that retrieves web pages 206 from web servers 110 and renders the retrieved web pages. Some of the web pages 206 include beacon code 208. In general, publishers of web pages may agree with the entity operating the collection server 130 to include this beacon code in some or all of their web pages. This code 208 is rendered with the web page in which the code 208 is included. When rendered, the code 208 causes the browser application 204 to send a message to the collection server 130. This message includes certain information, such as the URL of the web page in which the beacon code 208 is included. For example, the beacon code may be JavaScript code that accesses the URL of the web page on which the code is included, and sends to the collection server 130 an HTTP Post message that includes the URL in a query string. Similarly, the beacon code may be JavaScript code that accesses the URL of the web page on which the code is included, and includes that in the URL in the "src" attribute of an <img> tag, which results in a request for the resource located at the URL in the "src" attribute of the <img> tag to the collection server 130. Because the URL of the webpage is included in the "src" attribute, the collection server 130 receives the URL of the webpage. The collection server 130 can then return a transparent image. The following is an example of such JavaScript:

```
<script type="text/javascript">
    document.write("<img id='img1' height='1'
width='1'>");document.getElementById("img1").src="http://example.com/scripts/report.
dll?C7=" + escape(window.location.href) + "&rn=" +
Math.floor(Math.random( )*99999999);
    </script>
```

The collection server 130 records the webpage URL received in the message with, for instance, a time stamp of when the message was received and the IP address of the client system from which the message was received. The collection server 130 aggregates this recorded information and stores this aggregated information in the database 132 as online behavior data 132a.

The message may also include a unique identifier for the client system. For example, when a client system first sends a beacon message to the collection server 130, a unique identifier may be generated for the client system (and associated with the received beacon message). That unique identifier may then be included in a cookie that is set on that client system 102. As a result, later beacon messages from that client system may have the cookie appended to them such that the messages include the unique identifier for the client system. If a beacon message is received from the client system without the cookie (e.g., because the user deleted cookies on the client system), then the collection server 130 may again generate a unique identifier and include that identifier in a new cookie set of the client system.

Thus, as users of client systems 102 access webpages (e.g., on the Internet), the client systems 102 access the webpages that include the beacon code, which results in messages being sent to the collection server 130. These messages indicate the webpage that was accessed (e.g., by including the URL for the webpage) and potentially a unique identifier for the client system that sent the message. When a message is received at the collection server 130, a record may be generated for the received message. The record may indicate an identifier (e.g., the URL) of the webpage accessed by the client system, the unique identifier for the client system, a time at which the client system accessed the webpage (e.g., by including a time stamp of when the message was received by the collection server 130), and a network address, such as an IP address, of the client system that accessed the webpage. The collection server 130 may then aggregate these records and store the aggregated records in the database 132 as online behavior data 132a.

In addition, the beacon code and beacon messages may be used to collect demographic data and additional user data. For example, the beacon code may cause the client system to present a survey 210 to all or a subset of users visiting the webpage. The survey may be presented via the browser application 204. The survey 210 may include questions about basic demographic information (e.g., age gender, and income) and may also include more detailed questions associated with the additional user data (e.g., whether the user owns a house). To prevent too great an intrusion into the user's online experience, completion of the survey 210 may be made optional. If the user chooses to participate in the survey 210, the beacon code may send the user's responses to collection server 130 in the standard beacon messages described above with regard to the online behavior data 132a or in a separate message. The collection server 130 may then aggregate these records and store the aggregated records in the database 132 as demographic data 132b and additional user data 132c. Because the survey is optional, or because the survey is not presented to all users, the datastore 132 may only store demographic data, online behavior data, and additional user data for a subset of the users.

The beacon messages are generally sent regardless of whether or not the given client system has the panel application installed. But, for client systems in which the panel application is installed, the panel application also records and reports the beacon message to the collection server 130. For example, if the panel application is recording HTTP traffic, and the beacon message is sent using an HTTP Post message (or as a result of an <img> tag), then the beacon message is recorded as part of the HTTP traffic recorded by the panel application, including, for instance, any cookies that are included as part of the beacon message. Thus, in this instance, the collection server 130 receives the beacon message as a result of the beacon code, and a report of the beacon message as part of the panel application recording and reporting network traffic.

Because the beacon message is sent regardless of whether the panel application is installed, the online behavior data 132a directly represents accesses by the members of the larger universe to be measured, not just the members of the panel. As a result, for those web pages or groups of web pages that include the beacon code, the online behavior data 132a may serve as the baseline for generating audience measurement data. However, for various reasons, this initial data may include some inaccuracies. Therefore, the panel-based data may be used to increase the accuracy of the beacon-based data and the beacon-based data may be used to increase the accuracy of the panel-based data.

Taking both the panel-based approach and beacon-based approach into consideration, there are, therefore, various combinations of data regarding a user that may be stored in database 132 that was collected in various manners. Online behavior data 132a associated with each user may be collected through the panel-based and/or beacon-based approaches described above. Demographic data 132b associated with each user may be collected as part of a panel registration process prior to download of the panel application. Additionally or alternatively, demographic data 132b associated with each user may be collected through the user's response to a survey provided to all or a subset of panel members or all or a subset of users interacting with the beacon code.

Demographic data 132b may also be collected from other sources, such as from analysis of each user's online behavior data 132a. As with demographic data 132b, additional user data 132c may be collected, for example, through the user's response to a survey and/or through analysis of each user's online behavior data 132a. Some users may have some of their associated data collected through their participation in the panel and some through interaction with beacon code. Other users may have all of their associated data collected through their participation in the panel or through their interaction with beacon code.

Figure 3:
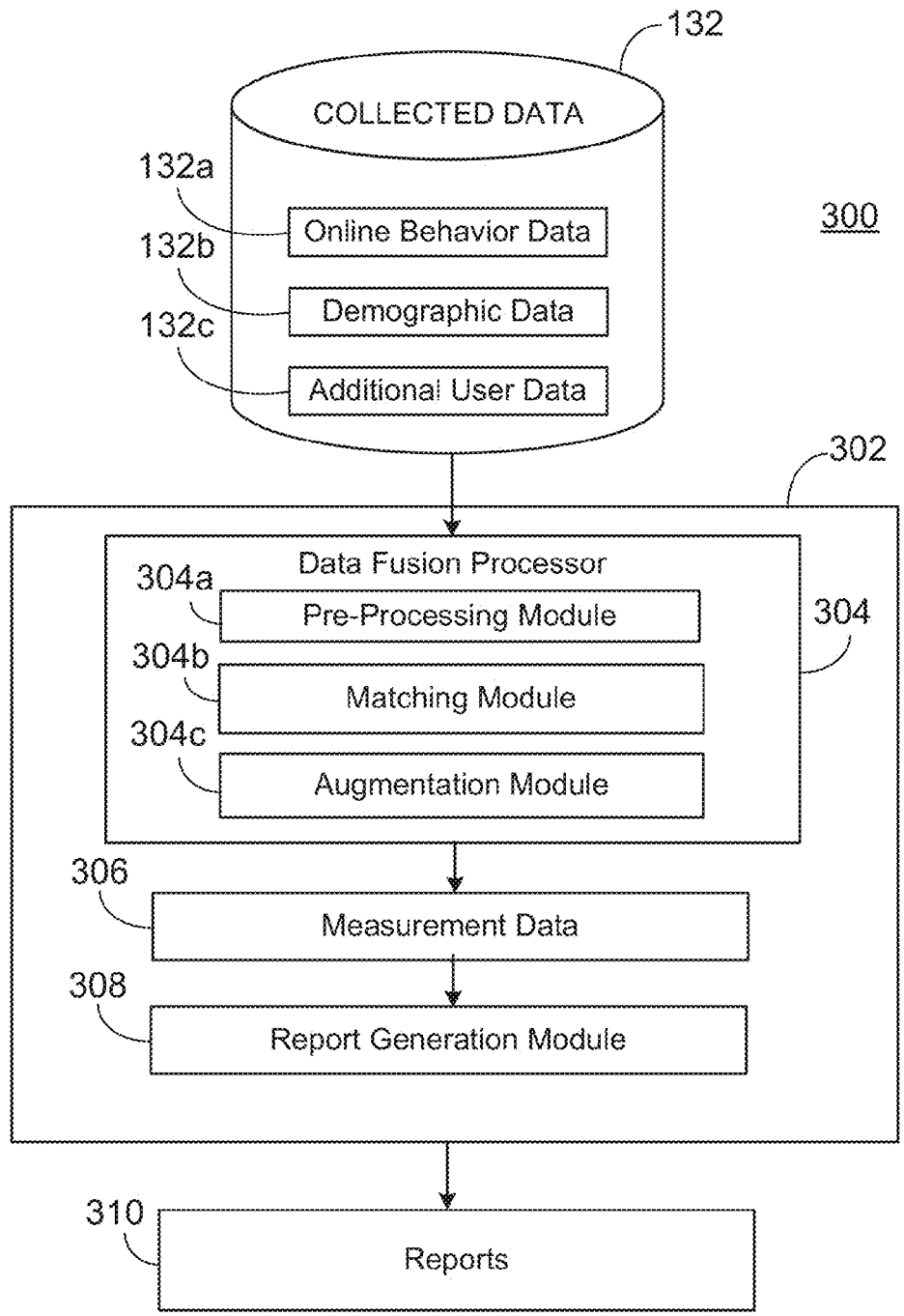
FIG. 3 illustrates an example of a system in which online behavior data, demographic data, and additional user data can be used to generate measurement data.

FIG. 3 illustrates an example of a system 300 in which online behavior data 132a, demographic data 132b, and additional user data 132c can be used to generate measurement data 306. The system 300 includes a reporting server 302. The reporting server 302 may be implemented using, for example, a general-purpose computer capable of responding to and executing instructions in a defined manner, a personal computer, a special-purpose computer, a workstation, a server, or a mobile device. The reporting server 302 may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by the reporting server 302.

The reporting server 302 executes instructions that implement a data fusion processor 304 and a report generation module 308. The data fusion processor 304 includes a pre-processing module 304a, a matching module 304b, and an augmentation module 304c. The data fusion processor 304 may implement a process, such as that shown in FIG. 4, to generate unified or adjusted measurement data 306 based on the online behavior data 132a, demographic data 132b, and additional user data 132c. The report generation module 308 may use the unified or adjusted measurement data 306 to generate one or more reports 310 that include information regarding client system accesses of one or more resources.

Figure 4:
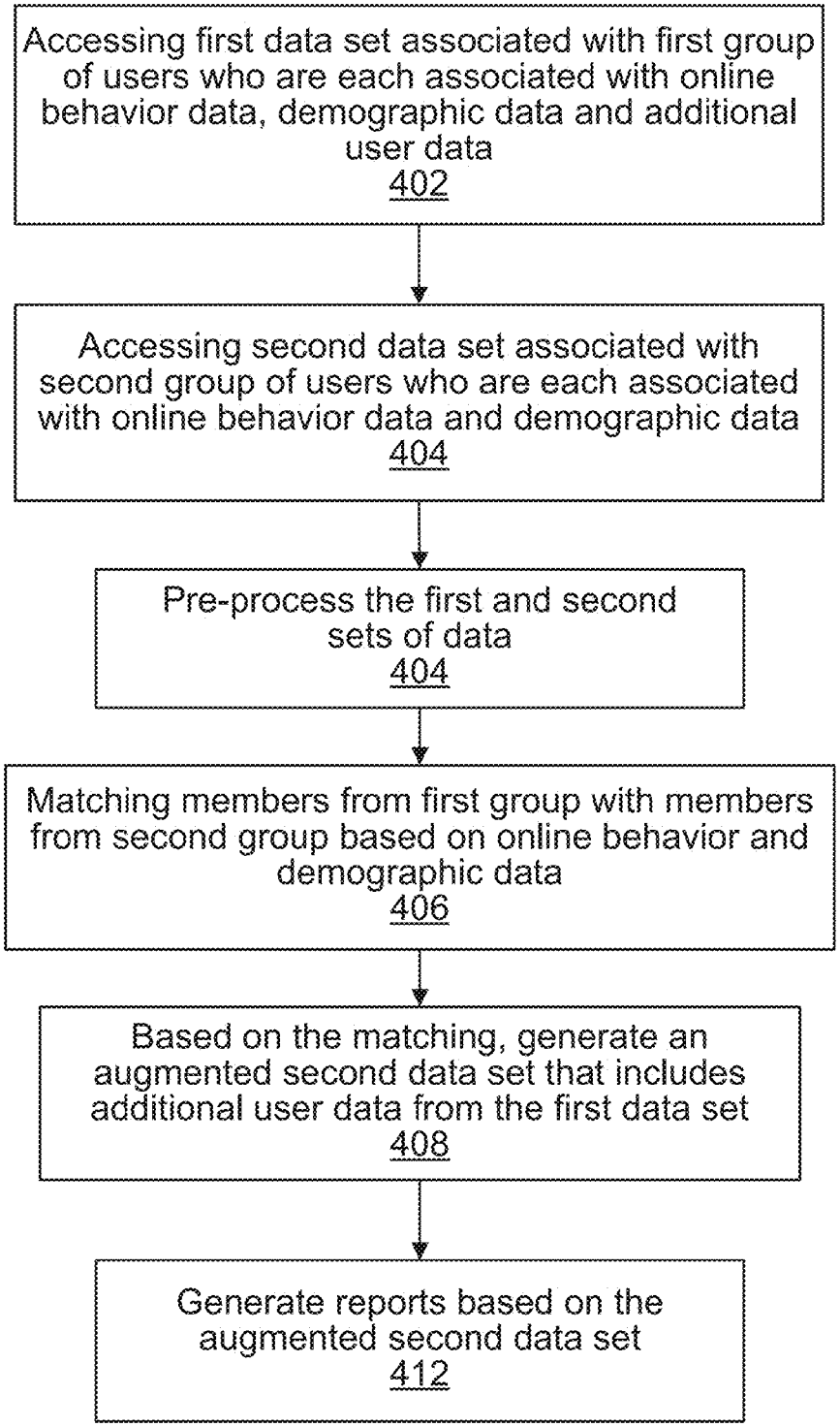
FIG. 4 is a flow chart illustrating an example of a process for attributing additional user data to users for whom online behavior data is collected.

FIG. 4 is a flow chart illustrating an example of a fusion process 400 for attributing additional user data to users for whom online behavior data is collected, but not such additional user data. For instance, the process 400 may be applied in a situation in which there is demographic data and online behavior data for members of a panel, with additional user data being collected for a subset of the members of the panel. The following describes process 400 as being performed by the pre-processing module 304a, the initial measurement module 304b, the measurement adjustment module 304c, and the report generation module 308. However, the process 400 may be performed by other systems or system configurations.

The pre-processing module 304a accesses a first data set associated with a first group of users (402). The first data set includes demographic data, online behavior data, and additional user data associated with the users in the first group. For example, each member of the first group of users may be associated with a set of online behavior data, demographic data, and additional user data. As such, the first data set may include online behavior data 132a, demographic data 132b, and additional user data 132c for each of the members of the first group of users. The online behavior data 132a, demographic data 132b, and additional user data 132c included in the first data set may have been collected through either the panel-based or beacon based approach.

If collected through the panel-based approach, the online behavior data 132a may include records that reflect the URLs or other identifiers of web pages or other resources accessed, the times those pages or resources were accessed, identifiers of the client systems that accessed the resources, and information about the requests and responses used to access the resources (for example, cookies sent in requests and/or received in the responses). If collected through the beacon-based approach, the online behavior data 132a may include records that reflect a URL or other identifier of a resource that has been accessed by a client system, a network address of the client system that accessed the resource, a time that the client system accessed the resource (for example, as reflected by a time stamp of the time at which the beacon message was received by the collection server 130), and a unique identifier for the client system that accessed the resource (for example, included in a cookie attached to the beacon message).

Whether collected through either the panel-based or beacon-based approach, the demographic data 132b may include user's age, sex, household size, household composition, geographic region, number of client systems, and household income. The additional user data 132c may reflect more detailed information about members of the panel including, for example, whether the user has remodeled his or her home in the past 6 months or whether the user has participated in community theatre in the past 6 months.

The pre-processing module 304a accesses a second data set associated with a second group of users (404). The second data set includes demographic data and online behavior data but not additional user data associated with the users in the second group. For example, each member of the second group of users may be associated with a set of online behavior data and demographic data, but not additional user data. Thus, in this example, the second data set includes online behavior data 132a and demographic data 132b for each of the members of the second group of users.

In one implementation, where a survey is used to collect the additional user data 132c, the first group of users represents users that received the survey, completed the survey, and submitted the answers. Moreover, while the users in the first group are associated with online behavior data 132a, the online behavior data 132a need not be reliable or voluminous enough for the user in the first group to be included in reporting. Conversely, where a survey has been used, the second group of users represents users that did not receive or otherwise did not participate in the survey. However, the users in the second group are included in reporting. In other words, the online behavior data 132a associated with the users in the second group is reliable and those users are included in the weighting and projection.

The online behavior data 132a, demographic data 132b, and additional user data 132c that is accessed by the pre-processing module 304a may be the data that is aggregated for a certain, previous time period. For example, the accessed first and second data sets may be based on the online behavior data 132a, demographic data 132b, and additional user data 132c aggregated over the previous 30 days.

The pre-processing module 304a performs one or more pre-processing functions on the accessed first and second data sets (406). For example, the pre-processing module 304a may process the raw online behavior data 132a to form state data that represents the complete fact of usage in a single record. For instance, for web page visitation, a record in the state data may indicate that a particular user, on a particular date, at a particular time, accessed web page B (as represented by the URL for that web page), using a particular client system. The pre-processing module 304a also may match some or all of the URLs in the records of the state data to patterns in a dictionary of the Internet, which may organize various different URLs into digital media properties, reflecting how Internet companies operate their businesses. Each pattern may be associated with a web entity, which may be a web page or collection of web pages that are logically grouped together in a manner that reflects how Internet companies operate their business. For example, the various web pages that are included in the finance. yahoo.com domain may be logically grouped together into a single web entity (e.g., Yahoo Finance). The dictionary may include a number of hierarchical web entities to reflect various Internet media companies and how those companies arrange their web properties. For example, the Yahoo Finance web entity may be considered a subset of the Yahoo web entity, which may cover all of the various web pages included in the yahoo.com domain. The Yahoo web entity may include other web entities, such as a Yahoo Health web entity (associated with the various web pages in the health.yahoo.com domain). The pre-processing module 304a may associate a given state record with the lowest-level web entity associated with the pattern matching the URL in the state record.

Based on matching the URLs in the records of the state data to the patterns in the dictionary, the pre-processing module 304a may distill the online behavior data 132a associated with each user of the first and second groups into a count of visits to a specific list of web pages and/or web entities. For example, for each user in the first and second groups, the pre-processing module 304a may create and store a count of visits to the top ten entities within each sub-category of entity classes in the dictionary (e.g., automotive, retail, e-mail, social network, etc.). The entities within each sub-category of entity classes may be ranked based on a number of factors that may be considered individually or in combination. For example, entities within each sub-category of entity classes may be ranked based on the popularity of the entity across the entire panel of users (reflected in, for example, the number of accesses or the subjective feedback of the users) and/or based on the requirements provided by an entity requesting the generated reports.

For use in action 406 the pre-processing module 304a may further transform the count of visits to various web pages and/or web entities now included in the online behavior data 132a associated with each user of the first and second groups. In particular, the pre-processing module 304a may perform a logarithmic transformation on the visit count data to make the difference between visiting an entity or not greater than the difference of any additional visits to that entity. To perform the logarithmic transformation, the pre-processing module 304a adds 1 to the count of visits to the entity, because, as in any base, log(0) is undefined and log(1)=0. The formula for logarithmic transformation is then:

Transformed visit count data=log($a$+1,$b$)

where 'a' is the count of visits to the entity, and 'b' is the log base. In one implementation, the pre-processing module 304a utilizes a base of 1000, but different bases may be used. The logarithmically transformed data is then used by the matching module 304b with regard to action 406

As referred to above, the pre-processing module 304a may also remove from the second data set records for users that are not to be included in the reporting sample. For example, there may be rules that are evaluated to insure that a complete record of a user's usage and non-usage during the reporting period is received. If those rules are not met, the user may be removed from the reporting sample. Also, a user may be removed if he or she does not meet certain criteria, such as being in a particular geographic area. Where a record is removed from a data set, the user associated with that record and all of the records associated with that user in the first or second data sets may also removed. In other words, the pre-processing module 304a may remove an entire user from the first or second group of users.

In addition, the pre-processing module 304a may remove certain types of individual records without removing the user. For instance, records that reflect redirects or that reflect non-human initiated requests (e.g., requests made as part of rendering a web page) may be removed. Additionally or alternatively, if the records indicate that sequential accesses to the same or different web pages in a web entity by a particular client system occur at a defined frequency (for example, if the accesses are spaced three seconds apart or less), then accesses subsequent to the first one may be removed. This may help to remove records from non-human initiated accesses, as well as errors associated with the beacon code that may result in more than one beacon message per access. However, there may be non-human initiated requests for which the entire user record should be removed. For example, a list of known search index crawlers or other robots may be used to remove records that reflect accesses from those bots. Such search index crawlers would represent non-human users in the first and second groups of users and may be undesirable in the reports.

In some implementations, records and associated users for certain types of client system devices may be removed. For instance, records for mobile devices may be removed. In some implementations, such records may be detected based on user agent data sent with the beacon message and recorded in the record. In addition, records and associated users may be removed for client systems not in a particular geographic area (e.g., if the reports are being generated for a particular geographic area, such as North America). The country and region of the client system corresponding to the record may be determined based on a reverse lookup of the network address (e.g., a reverse lookup of the IP address). Similarly, shared use client systems (e.g., client systems available to the public in a library) may be detected by analyzing the network access provider based on a reverse look-up of the client system's IP address (which may be captured with the beacon message).

Pre-processing of the online behavior data 132a may also involve delineating between classes of client systems. At times, it may be desirable to segment reports according to classes of client systems. For example, in one implementation, the reports and underlying data, at least initially, are segmented into work vs. home client systems, with home client systems being those that are used at home while work client systems are those used at work. These two subpopulations can be identified and separated in the panel-based online behavior data 132a because users self-identified the machines as home or work (or another class) when registering. To identify and separate these two sub-populations in the beacon-based online behavior data 132a, the beacon messages received between 8 am and 6 pm local time Monday through Friday may be assumed to be work generated traffic. All other traffic may be aligned as targets for the Home sample.

In another example for identifying and separating these two subpopulations in the beacon-based online behavior data 132a, a model may be developed based on observed work behavior in the panel-based online behavior data 132a. This model may be based on time of day and day of week usage profiles. If an IP address matches the expected profile for a work machine, all traffic for that IP address may be considered work traffic. For instance, panel data may indicate that, if the number of accesses during a first time period (a work time) is greater than the number of accesses during a second time period (a home time period) by a certain amount, then a machine is probably a work machine. This information may be used, together with the beacon data, to classify network access providers into work or home based on the whether or not accesses by users of those network access providers are greater during the work time than the home time, on average, by the certain amount. The network access provider of a given machine may then be determined based on that machine's IP address, and that machine may be classified as the same class as the network access provider.

The pre-processing module 304a may also apply pre-processing functions to the accessed demographic data 132b. The accessed demographic data 132b may be initially stored as a raw value. For example, a user's income may be stored as an exact dollar value (e.g., $75,000 per year). Moreover, the accessed demographic data 132b may be initially stored in different formats between the first and second data sets. Such raw data values may decrease the accuracy and efficiency of action 408. Therefore, the pre-processing module 304a may standardize the accessed demographic data 132b into specific formats and levels suitable for action 408 based on a set of rules. For example, the pre-processing module 304a may standardize a user's income to indicate that the user falls within a certain band of income (e.g., less than $25,000, $25,000 to $50,000, and above $50,000). Depending on the band in which the user's income falls, the pre-processing module 304a may store the user's income as a single integer representative of the user's income. Table 1, below, represents an example of an income standardization process. The pre-processing module 304a may similarly standardize the other accessed demographic data 132b as necessary.

TABLE 1

| User ID | Raw Income | Standardized Income |
|---------|-----------|---------------------|
| 123     | $15,000   | 1                   |
| 456     | $67,000   | 3                   |
| 789     | $27,800   | 2                   |

The pre-processing module 304a may store the results of the pre-processing functions in various formats. For example, the pre-processed online behavior data 132a from the first data set may be stored in a first text file and organized in a manner that individually groups all of the online behavior data 132a associated with each user in the first group of users. Similarly, the pre-processed online behavior data 132a from the second data set may be stored in a second text file and organized in a manner that individually groups all of the online behavior data 132a associated with each user in the second group of users. Files may be similarly organized and stored for the pre-processed demographic data 132b from the first data set and the pre-processed demographic data 132b from the second data set. Each of these files may then be used in actions 408, 410, and 412. Alternatively, the results of the pre-processing functions may be similarly stored in database or XML format.

Once the pre-processing module 304a has completed the pre-processing functions and stored the results, the matching module 304b determines one or more sets of matched users based on the demographic data and online behavior data included in the first data set and the demographic data and online behavior data included in the second data set (406). Each set includes a user from the first group matched with a user from the second group. For example, the matching module 304b may match each user from the second group of users with a user from the first group of users based on the pre-processed online behavior data 132a and demographic data 132b included in each of the accessed first and second data sets. Based on the pre-processed behavior data 132a and demographic data 132b, the matching module 304b determines which user in the first group of users is most similar to each user in the second group of users.

In an implementation where the additional user data 132c is obtained through the use of surveys, the first group of users may be small in number relative to the second group of users. For instance, each survey may present the user with a long, detailed list of questions that can be time-consuming to complete. Therefore, the number of users in the panel that are willing to complete the survey may be relatively small. As a result, it is possible that not each of the member of the second group of users, who are each associated with enough reliable online behavior data to be included in the reporting, will have completed a survey. In such an implementation, there may be, for example, 5,000 to 10,000 users included in the first group of users, about 250,000 users included in the second group of users, and about 500 users that overlap between the first and second groups of users. As described above, there are benefits to attributing the detailed survey data associated with the first group of users with each of the second group of users that will be included in reporting. In so doing, the reports may be further indexed based on the survey data, allowing for more granular reports. Therefore, in one implementation, the goal of the matching module 304b is to match each member of the second group of users, who are each associated with enough reliable online behavior data to be included in the reporting, with the most similar member of the first group of users, who has completed a survey, so that the additional user data resulting from the survey can be imputed to the matching member in the second group.

There are numerous techniques by which the matching module 304b may utilize both the online behavior data 132a and demographic data 132b to determine which user in the first group of users is most similar to each user in the second group of users. One such technique is described below with regard to FIG. 5. However, other techniques may be implemented.

The augmentation module 304c generates, based on the one or more sets of matched users, an augmented second data set that includes additional user data associated with the users in the second group (408). For example, the augmented second data set may include additional user data from the first data set. In this example, to generate the augmented second data set, the augmentation module 304c associates the additional user data 132c associated with the members of the first group of users with the member of the second group of users to whom each member of the first group of users has been matched. In other words, for each member of the second group of users, the augmentation module 304c associates the member of the second group of users with the additional user data 132c associated with the member of the first group of users to whom the member of the second group was matched by the matching module 304b.

In the implementation where the additional user data 132c is obtained through the use of surveys, the augmentation module 304c associates the additional user data 132c of a member of the panel that completed a survey with a member of the panel who is associated with enough reliable online behavior data to be included in the reporting but who may not have completed a survey. The augmentation module 304c therefore attributes or imputes the detailed survey responses associated with one user to the most similar user that will be included in the reporting process.

The report generation module 308 generates audience measurement reports based on the augmented second data set (410). The report generation module 308 may also generate audience measurement reports based on a combination of the first data set and the augmented second data set. Moreover, the report generation module 308 may generate the audience measurement reports based on any combination of the online behavior data, demographic data, and additional user data included in the first and augmented second data sets. For example, in an implementation in which the initial data is delineated between home and work client systems, the report generation module 308 may generate reports on unique visitors or page views for a given web entity for one or both of the home or work populations. Additionally, or alternatively, in such an implementation, the report generation module 308 may generate reports on unique visitors or page views for a given web entity that combine the home and work populations. In other words, the report generation module may combine the page views for the home and work populations into a combined count of page views and/or may combine the unique visitors for the home and work populations into a combined count of unique visitors.

Additionally, the report generation module 308 may generate reports that are based on the additional user data 132c. For example, in an implementation in which the additional user data 132c includes an indication of whether each user purchased a home in the previous six months, the report generation module 308 may generate reports on unique visitors or page views for a given web entity for the home purchaser population. In other words, individual web entities will be able to determine how many people who purchased a home in the previous six months visited their web page(s) and how often.

Figure 5:
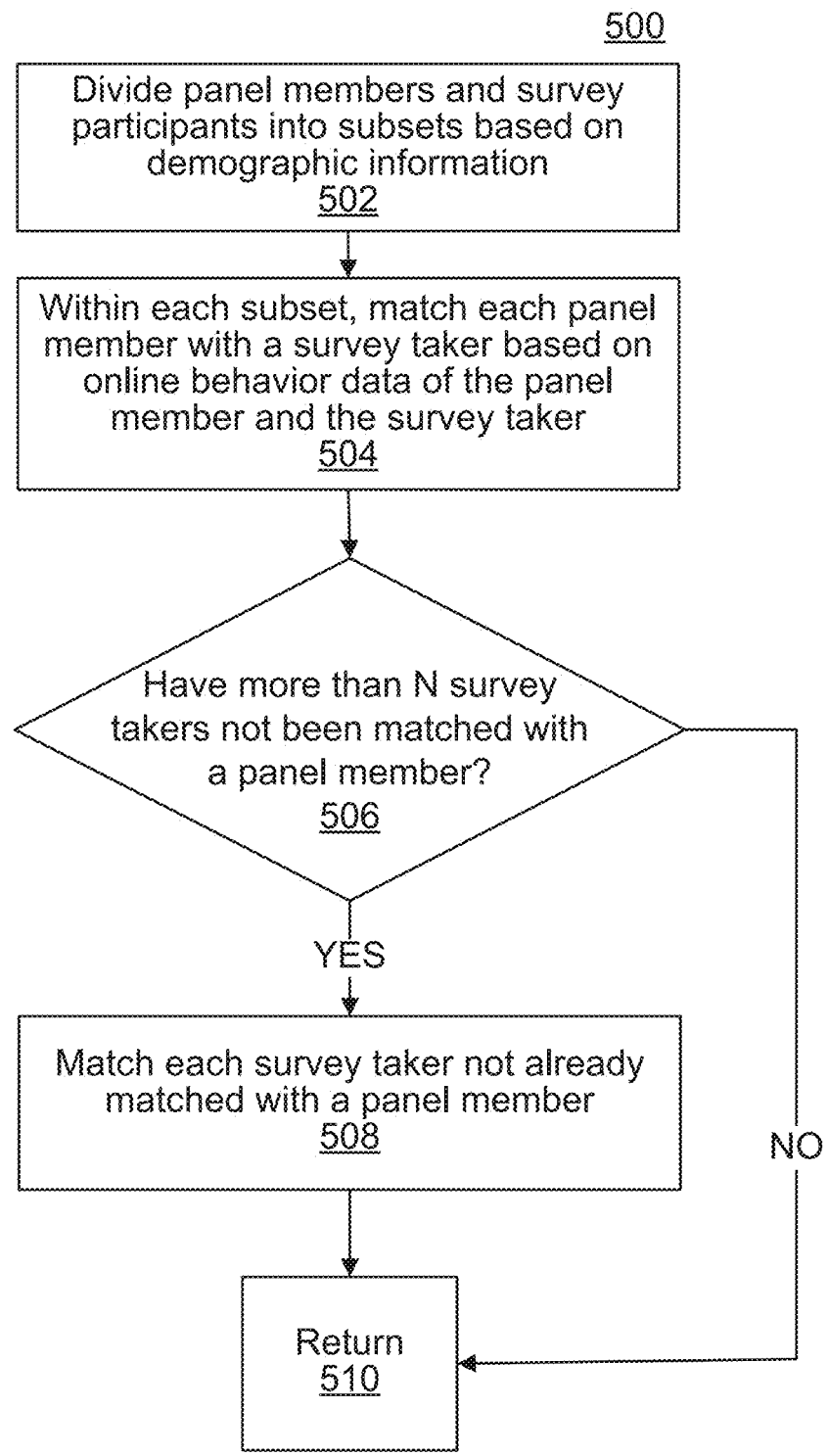
FIG. 5 is a flow chart illustrating an example of a process for matching users in a second group of users with users in a first group of users.

FIG. 5 is a flow chart illustrating an example of a process 500 for matching each of the users in the second group of users with a user in the first group of users. The following describes process 500 as being performed by the matching module 304b. However, the process 500 may be performed by other systems or system configurations. Moreover, the following describes process 500 with regard to an implementation in which the additional user data 132c was collected via a survey. However, the process 500 is similarly applicable to implementations in which the additional user data 132c is collected in an alternative manner.

Initially, the matching module 304b divides the members of the first group (i.e., survey takers) and the members of the second group (i.e., non-survey takers) into subsets based on the demographic information 132b associated with each user (502). Generally, Internet users with similar demographic profiles may be similar in other behaviors and attitudes. Therefore, under this assumption, the first step of matching survey takers and non-survey takers may be to group them into subsets of users that share the same demographic profile. Accordingly, the matching module 304b creates a subset for each possible demographic profile based on the information contained in the demographic data 132b associated with each user. For example, the demographic data 132b may include information regarding a user's age, gender, zip code, income, race, ethnicity, whether there are children present in the user's household, and the size of the user's household. Each of these pieces of information may be referred to as a demographic variable and is a basis upon which the matching module 304b may match users.

The matching module 304b may group the survey takers and non-survey takers based on any number or combination of demographic variables contained in the demographic data 132b. For example, the matching module 304b may group survey takers and non-survey takers based only on the users' age, gender, zip code, and income. In some implementations, the matching module 304b groups the survey takers and non-survey takers based on an exact match between the demographic variables upon which the grouping is based. In other implementations, the matching module 304b may assign weights to the various factors when grouping the survey takers and non-survey takers, such that, for example, a user's age is more important in determining a demographic match than a user's income. For example, the matching module 304b may consider the demographic variables in the following descending order of weight: age, gender, zip code, income, race, ethnicity, whether there are children present in the user's household, and the size of the user's household. However, any other orderings may be applied by the matching module 304b, as appropriate.

In one operational example, the matching module 304b may consider the demographic variables of age, gender, and income. Based on the above-described pre-processing performed by pre-processing module 304a, each demographic variable may be standardized to a set number of levels. For example, gender may be standardized to two levels (i.e., male or female), age may be standardized to six levels (under 10 years old, 10 to 20 years old, 20 to 30 years old, etc.), and income may be standardized to seven levels (less than $25,000; $25,000 to $49,999; $50,000 to $79,999; etc.). Under such standardization, there are eighty four possible demographic profiles ($2 \times 6 \times 7 = 84$). Therefore, in this example, the matching module 304b will group each survey taker and non-survey taker into one of the eighty four possible demographic profile groups. For example, every male who is 20 to 23 years old and makes $50,000 to $79,999 will be grouped together because they share the same demographic profile.

In some implementations, the matching module 304b may select at least one member of the first group of users and at least one member of the second group of users to be included in each demographic profile group so that each member included in a demographic profile group may be matched with another member in the same demographic profile group. Generally, the total number of users included in the first and second groups of users results in there being multiple members of the first group of users and multiple members of the second group of users that exactly match each possible demographic profile group. However, where a demographic profile group lacks a member of the first or second group of users, the matching module 304b may rely upon the weighting of demographic variables described above to determine the user with the closest matching demographic profile to be added. Alternatively, where a demographic profile group lacks a member of the first or second group of users, the matching module 304b may change the number or type of demographic variables being used to group the users.

The matching module 304b may also divide the members of the first group and the members of the second group into subsets based on factors other than demographic data associated with each user. For example, the matching module 304b may also divide the members of the first group and the members of the second group into subsets based on assigning each user from the first and second groups of users a random number and dividing the users according the their assigned random number. Alternatively, the matching module 304b may also divide the members of the first group and the members of the second group into subsets based on online behavior data associated with each user.

Within each demographic profile group into which the matching module 304b grouped each member of the first and second groups of users, the matching module 304b matches each member of the second group of users (i.e., non-survey taker) with a member of the first group of users (i.e., survey taker) based on online behavior data 132a associated with each of the members of the first and second groups of users (504). For example, within a demographic profile group comprised of males who are 20 to 30 years old and make $50,000 to $79,999, there may be three survey takers and twenty seven non-survey takers. For each of the twenty seven non-survey takers, the matching module 304b will determine which one of the three survey takers has the most similar online behavior data to the non-survey taker.

In one implementation, the matching module 304b determines the similarity of two users' online behavior data by comparing the distance between the two multivariate vectors that represent the users' online behavior data. Each multivariate vector includes various online behavior variables contained in each users' online behavior data. Each online behavior variable may, for example, represent a number of times that a user has visited a web entity contained in the dictionary described above with regard to action 406. Thus, in one implementation, a user's vector of online behavior data may include representations of the numbers of times that a user has visited each of www.google.com, www.cnn.com, www.facebook.com, and www.twitter.com. Alternatively, the vectors created and considered by the matching module 304b may include other online behavior variables. For example, the online behavior variable may represent the number of minutes a user has spent interacting with a web entity over a particular period of time.

The matching module 304b may determine the distance between two multivariate vectors that represent two users' online behavior data by determining the Mahalanobis distance between the two vectors. Mahalanobis distance between two vectors is defined as:

$$d(\bar{x}_m, \bar{x}_p) = \sqrt{(\bar{x}_m - \bar{x}_p)^T S^{-1} (\bar{x}_m - \bar{x}_p)},$$

where $\bar{x}_m$ is the vector of online behavior data for a member of the second group of users, $\bar{x}_p$ is the vector of online behavior data for a member of the first group of users, and $S^{-1}$ is the covariance matrix of the combined data. The survey taker that has the most similar online behavior data to any given non-survey taker is the survey taker with the online behavior data that has the smallest Mahalanobis distance to the online behavior data of the non-survey taker. Alternatively, the matching module 304b may employ other distance formulations, such as Euclidean distance, to determine the similarity of two users' online behavior data. The matching module 304b may utilize a statistical software program, such as R® or SAS®, to determine the distance between the two multivariate vectors that represent the two users' online behavior data. However, the matching module 304b is not dependent upon the unique technical capabilities of any particular program.

Within each subset, the matching module 304b may also match each member of the second group of users (i.e., non-survey taker) with a member of the first group of users (i.e., survey taker) based on factors other than online behavior data associated with each user. For example, in an implementation where the matching module 304b divides the members of the first group and the members of the second group into subsets based on online behavior data associated with each user, the matching module 304b may match each member of the second group of users with a member of the first group of users based on demographic data associated with each user.

After initially matching each member of the second group of users with a member of the first group of users, there may be members of the first group of users that have not been matched. Members of the first group of users who have not been matched will result in additional user data 132c that is not used in generating the augmented second data set. Given the possibility of a relatively small population of survey takers, failing to utilize all of the additional user data 132c may result in the inefficient use of a valuable resource (i.e., answers to detailed survey questions). In some implementations, the matching module 304b may be designed to address this inefficiency.

In that case, the matching module 304b determines the number of members of the first group that have not been matched with members of the second group (506). Depending on the number of unmatched members of the first group, the matching module 304b may take steps to determine a match for the unmatched members. Where there are N users for whom survey data has been collected, there exists a threshold percentage of the N users that, when the number of unmatched members of the first group exceeds this threshold, the matching module 304b determines a member of the second group to match with each of the unmatched members of the first group (508). For example, where there are 100,000 users for whom survey data has been collected, the threshold percentage may be set at 5%. Therefore, when there are 5,000 unmatched survey takers, the matching module 304b will find a matching non-survey taker for each of the unmatched survey takers.

To make the matches between the unmatched survey takers and a non-survey taker, the matching module 304b may perform action 504 for each of the unmatched survey takers, as opposed to each of the non-survey takers. In other words, for each unmatched survey taker within a subset, the matching module 304b may find a matching non-survey taker within the same subset based on the above-described comparison of online behavior data 132a associated with each user. Where the matching module performs action 508, the new match determined by the matching module 304b replaces the original match determined as a result of action 504.

Once each of the members of the second group have been matched with a member of the first group as describe above with regard to actions 502-508, the matching module 304b returns the matches to augmentation module 304c.

Figure 6A:
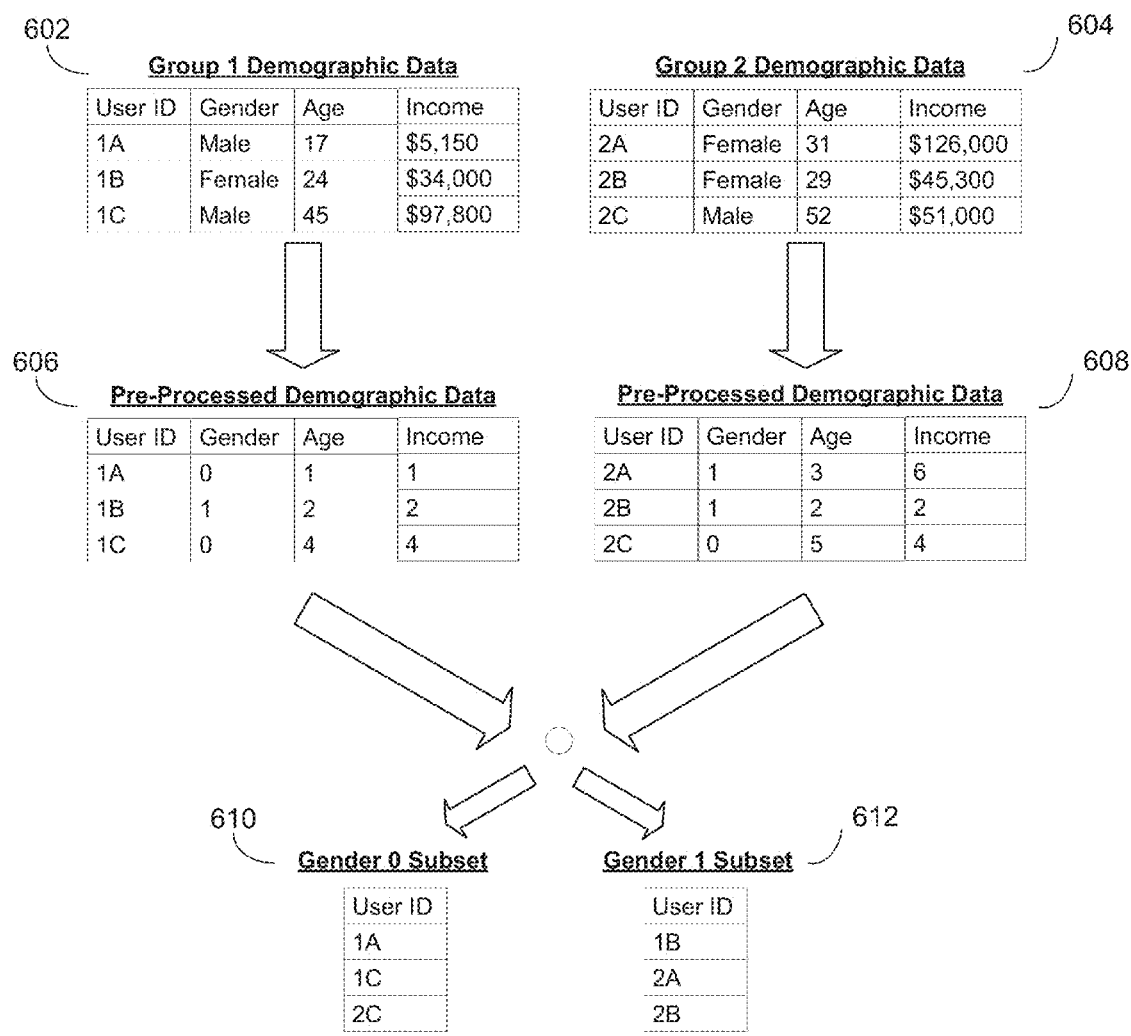
FIGS. 6A, 6B, and 6C illustrate an example of data at various points in the processes illustrated in FIGS. 4 and 5.
Figure 6B:
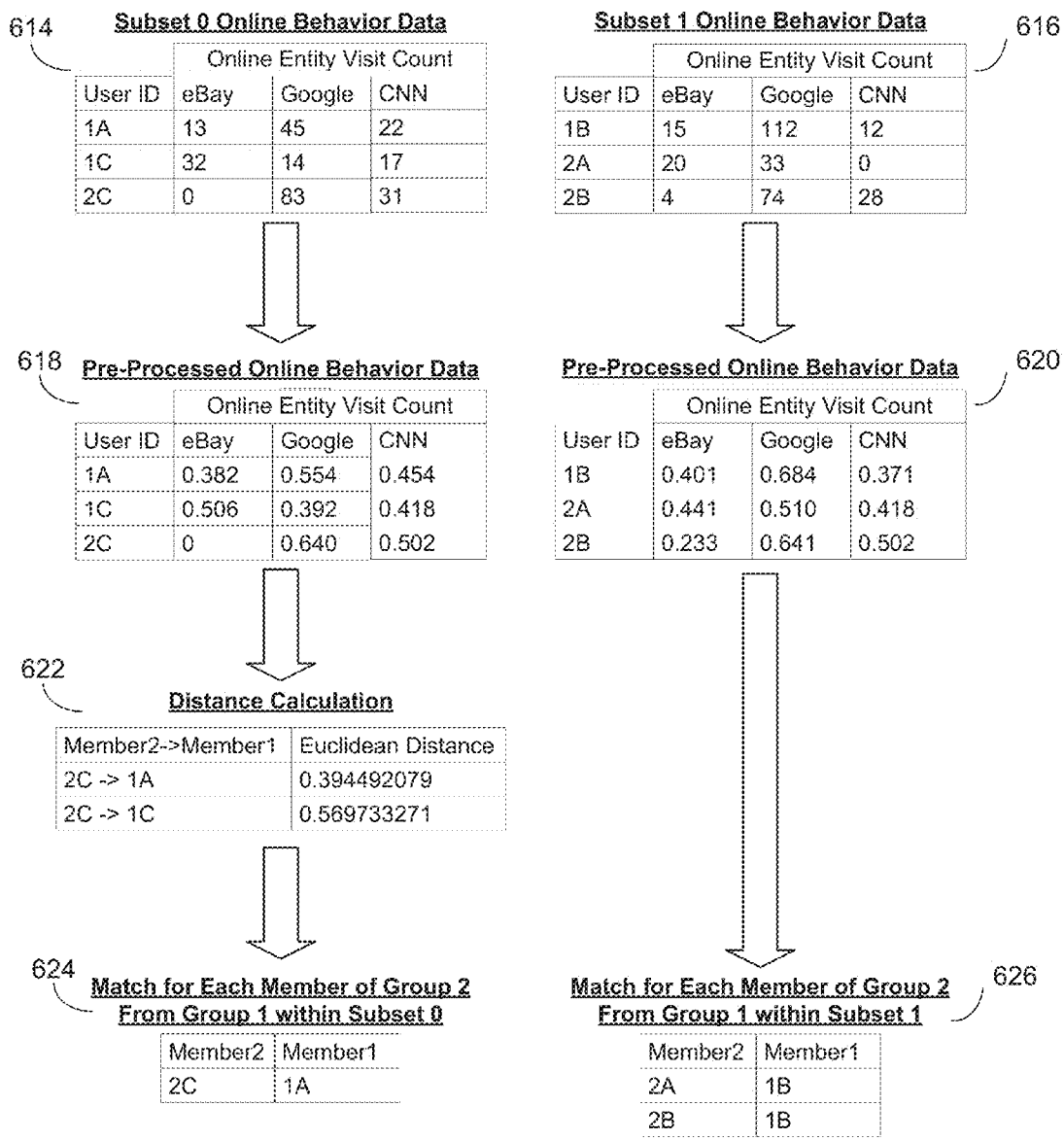
Figure 6C:
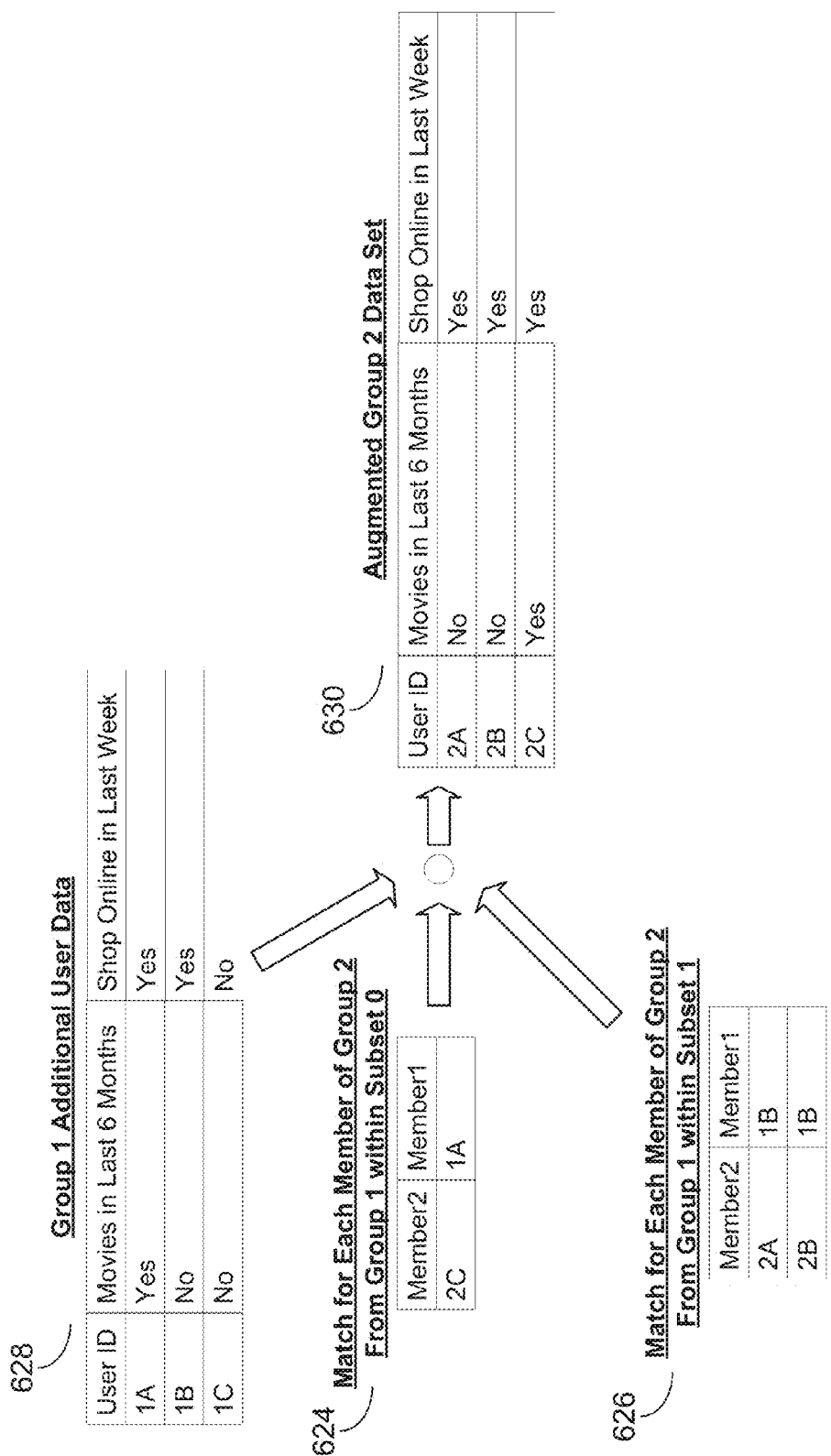

FIGS. 6A, 6B, and 6C illustrate an example of data at various points in the processes illustrated in FIGS. 4 and 5. The following describes processes 400 and 500 as being performed by the data processor 304. However, the processes 400 and 500 may be performed by other systems or system configurations.

In FIG. 6A, the pre-processing module 304a accesses a first data set associated with a first group of users. The first data set includes demographic data 602. For each of users 1A, 1B, and 1C in the first group, the demographic data 602 includes information indicative of the user's gender, age, and household income. The pre-processing module 304a also accesses a second data set associated with a second group of users. The second data set includes demographic data 604. For each of users 2A, 2B, and 2C in the second group, the demographic data 604 includes information indicative of the user's gender, age, and household income.

In this example, where a survey is used to collect the additional user data, the first group of users represents users that completed the survey and submitted the answers. The members of the second group of users (2A, 2B, and 2C) did not complete the survey and, therefore, are not associated with any additional user data. However, the members of the second group of users are associated with enough reliable online behavior data to be included in the weighting and projection.

The pre-processing module 304a performs one or more pre-processing functions on the accessed first and second data sets. With regard to the demographic data 602 and 604, the pre-processing module 304a standardizes into specific levels suitable for processing by the matching module 304b. In this example, each user's gender is transformed into an integer (i.e., '0' for males and '1' for females). Similarly, each user's age and income are both transformed into integers representing ranges of possible values (e.g., '1' for $0 to $24,999 or '3' for $50,000 to $74,999 in income and '1' for 0 to 19 years old or '3' for 30 to 39 years old).

Once the pre-processing module 304a has completed the pre-processing functions and stored the results, the matching module 304b divides the members of the first group (i.e., survey takers) and the members of the second group (i.e., non-survey takers) into subsets based on the demographic information 132b associated with each user. In this example, the matching module 304b relies upon the gender demographic variable as the basis upon which it matches users. However, in practice, other variables or combination of variables may be used.

Because there is only one demographic variable (i.e., gender) and the standardized demographic variable includes only two possible levels (i.e., '0' or '1'), there are only two possible demographic profiles. Therefore, the matching module 304b will group each member of the first and second groups into two possible subsets, each corresponding to one of the possible demographic profiles. In this example, users 1A, 1C, and 2C are grouped into a first subset 610 because they are each males. Similarly users 1B, 2A, and 2B are grouped into a second subset 612 because they are each females.

The accessed first and second data sets also include online behavior data 614 and 616. In FIG. 6B, the online behavior data is shown, for illustrative purposes, in association with the users grouped into their respective subsets. For each of the users in the first and second groups, the online behavior data 614 and 616 includes information indicative of the count of visits to a list of web pages and/or web entities (i.e., eBay, Google, and Facebook). These entities may represent entities contained in the dictionary of the Internet. Moreover, the count of visits associated with each user with regard to each entity represents the number of times the user requested and accessed the web entity during the reporting period (e.g., the foregoing month).

With regard to the online behavior data 614 and 616, the pre-processing module 304a transforms the count of visits to each of the web entities included in the online behavior data associated with each user of the first and second groups. In particular, the pre-processing module 304a has performed a logarithmic transformation (618 and 620) on the visit count data. In this example, the pre-processing module 304a utilizes a base of 1000 for the logarithmic formula.

Within each of the first and second subsets, the matching module 304b matches each member of the second group of users with a member of the first group of users based on the online behavior data associated with each of the members. With regard to the first subset, there is only one member of the second group (i.e. user 2C), but there are two members of the first group (i.e., users 1A and 1C). Therefore, the matching module 304b determines which member of the first group has the most similar online behavior data to user 2C.

In this example, the matching module 304b determines the similarity of two users' online behavior data by comparing the Euclidean distance between the two multivariate vectors that represent the users' online behavior data (622). Here, the Euclidean distance between the vector representing the online behavior data of user 2C and the vector representing the online behavior data of 1A is less than the Euclidean distance between the vector representing the online behavior data of user 2C and the vector representing the online behavior data of user 1B. Therefore, the matching module 304b determines that the online behavior data of user 1A is more similar to the online behavior data of user 2C than the online behavior data of user 1B. Accordingly, matching module 304b matches user 2C with user 1A (624). Though there is one unmatched member of the first group in the first subset, there is no way to match user 1B with a user within the first subset without causing the other member of the first group in the first subset to become unmatched. Therefore, matching module 304b does not perform action 508.

With regard to the first subset, there are two members of the second group (i.e. users 2A and 2B), but there is only one member of the first group (i.e., user 1B). Because there is only one member of the first group, the matching module 304b matches each of users 2A and 2B with user 1B (626). Next, the matching module 304b returns the matches 624 and 626 to augmentation module 304c.

The augmentation module 304c generates an augmented second data set that includes additional user data from the first data set. As shown in FIG. 6C, the augmentation module 304c relies upon the matches 624 and 626 returned by the matching module 304b, as well as additional user data 628 included in the first data set, to generate an augmented second data set 630. To generate the augmented second data set, the augmentation module 304c associates the additional user data 628 associated with the members of the first group of users (i.e., users 1A, 1B, and 1C) with the member of the second group of users to whom each member of the first group of users has been matched. For example, because user 2C has been matched with user 1A, the augmentation module 304c associates the additional user data associated with user 1A with user 2C. The report generation module 308 may then generate audience measurement reports based on the augmented second data set.

Figure 7A:
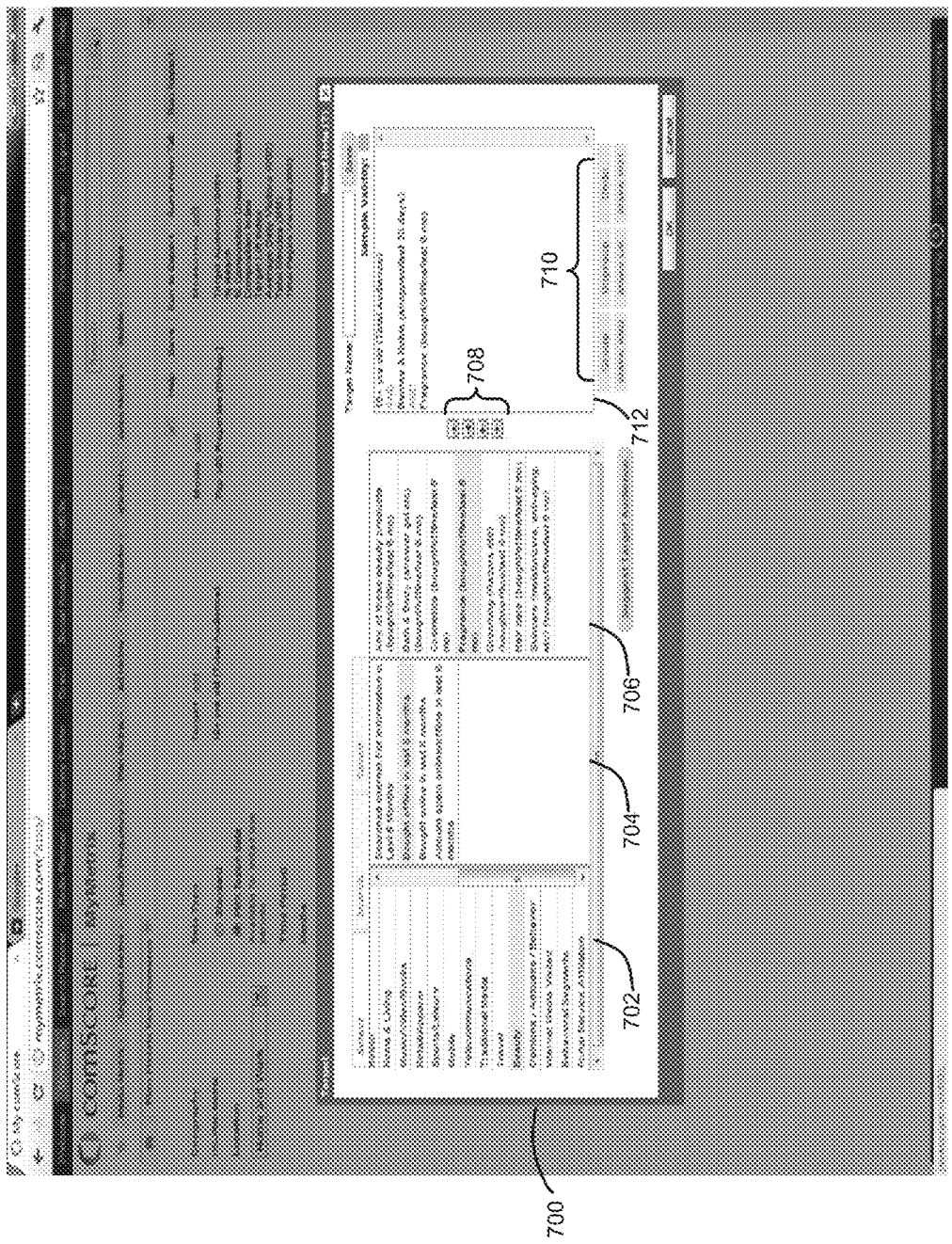
FIGS. 7A and 7B illustrate examples of interfaces to a report generation module.
Figure 7B:
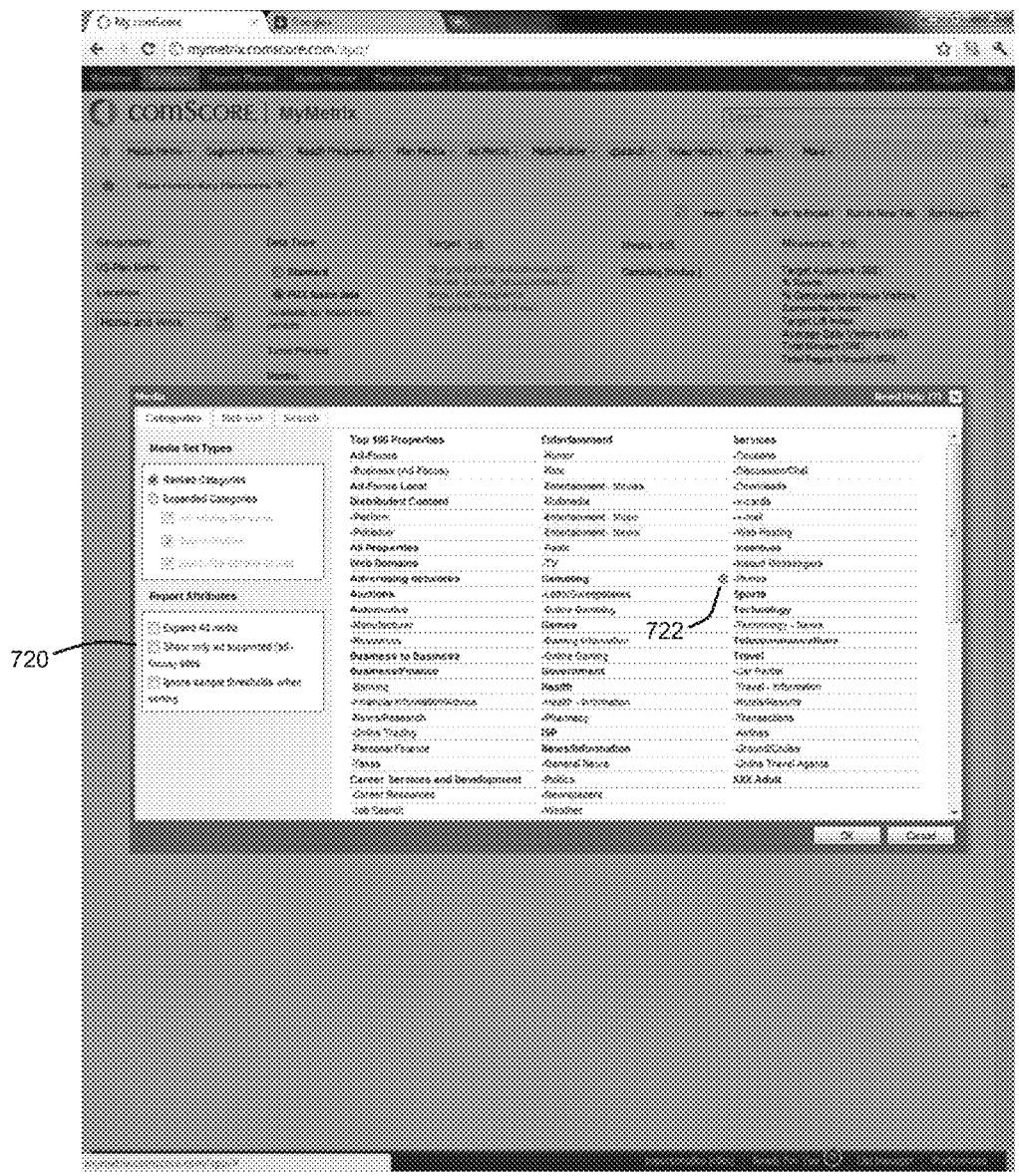
Figure 7C:
FIG. 7C illustrates an example of an audience measurement report generated by a report generation module.

FIGS. 7A and 7B illustrate examples of interfaces to the report generation module 308 and FIG. 7C illustrates an example of an audience measurement report generated by report generation module 308. However, the interface to and reports generated by the report generation module 308 may take any number of various formats.

In this example, FIG. 7A shows an interface to the report generation module 308 that allows a user to select variables upon which an audience measurement report may be based. As described above, the report generation module 308 may weight and project the client systems represented in the augmented second data set to the universe of all client systems. Thus, the report generation module 308 may combine one or more demographic variables contained in the augmented second data set to generate audience measurement reports that project the online behavior data across various demographic profiles of the universe of client systems. For example, the report generation module 308 may base generate audience measurement reports based on the additional user data that was included in the augmented second data set.

In FIG. 7A, the report generation module 308 presents a user with a tree structure from which to choose target audience variables upon which an audience measurement report may be based. Target audience variables may be derived from the demographic data 132*b* and/or additional user data 132*c* associated with the users that may be included in the report. In particular, target window 700 includes sub-windows 702, 704, and 706 that represent a tree structure of target audience variables. Sub-window 702 includes a list of broad categories under which the target audience variables may be grouped and listed. For example, the broad categories may include categories for mobile, travel, and beauty, among others. Sub-window 704 includes a list of sub-categories within the broad category of beauty. For example, the sub-categories may include whether the users have bought various beauty products online in last six months and the combined amount the users have spent online and offline in the last six months, among others. Sub-window 706 includes a list of target audience variables under the subcategory of whether the users have bought various beauty products online in last six months. For example, the target audience variables may include whether the users have bought any cosmetics offline in the last six months or whether the user has bought any fragrances offline in the last six months, among others.

Target window 700 also includes various controls 708 and 710 for adding and removing the target audience variables to and from the audience measurement report. The controls 708 are various arrows that, when selected by a user, cause the report generation module 308 to add a target audience variable to the audience measurement report (i.e., arrow pointing from sub-window 706 to sub-window 712), remove a target audience variable from the audience measurement report (i.e., arrow pointing from sub-window 712 to sub-window 706), increase the position of a target audience variable in the list of target audience variables displayed in sub-window 712 (i.e., arrow pointing toward the top of sub-window 712), or decrease the position of a target audience variable in the list of target audience variables displayed in sub-window 712 (i.e., arrow pointing toward the bottom of sub-window 712).

The controls 710 correspond to various logic functions for interrelating the selected target audience variables. For example, the controls 710 include a number of Boolean functions. When a user selects the "Make AND" control, the report generation module 308 inserts a logical "and" operator to the sub-window 712 at the selected position. In this manner, the user may relate two target audience variables with the logical "and" operator, such that the generated audience measurement report will include users corresponding to both of the target audience variables. Similarly, when a user selects the "Make OR" control, the report generation module 308 inserts a logical "or" operator to the sub-window 712 at the selected position. In this manner, the user may relate two target audience variables with the logical "or" operator, such that the generated audience measurement report will include users corresponding to either or both of the target audience variables.

Thus, the sub-window 712 included in target window 700 includes a list of target audience variables selected by the user interrelated by the selected logic functions. Once the user has selected all of the target audience variables that he/she wishes to include in the audience measurement report, the user may select the "OK" button included at the bottom of target window 700 and the report generation module 308 will store the selected target audience variables.

FIG. 7B shows an interface to the report generation module 308 that allows a user to select the types of online behavior data that the user would like to include in the generated audience measurement report. A user of the report generation module 308 may only be interested in certain types of online behavior data. For example, an online entity that operates a sports-related webpage may only be interested in online behavior data related to user visits to sports-related webpages.

Therefore, once the users that will be included in the audience measurement report are selected based on the stored target audience variables, the user may interact with media window 720 to select the types of online behavior data to include in the audience measurement report. Media window 720 includes a list of categories and sub-categories of online behavior data associated with the users included in the second group. For example, the media window 720 includes a "Sports" category and a "Humor" sub-category under the "Entertainment" category. A user may interact with the media window 720 to select one or more categories and/or sub-categories of online behavior data. The media window 720 may additionally or alternatively include a list of specific online entities and/or webpages included in the online behavior data.

When a user selects a type of online behavior data by interacting with media window 720, the report generation module 308 will update the media window 720 with an indication 722 that the user has selected the type of online behavior data. Once the user has selected all of the types of online behavior data that he/she wishes to include in the audience measurement report, the user may select the "OK" button included at the bottom of media window 720 and the report generation module 308 will store the selected types of online behavior data.

Once the user has specified the target audience variables and types of online behavior data upon which the audience measurement report is to be based, the report generation module 308 is configured to generate the audience measurement report. FIG. 7C illustrates an example of such an audience measurement report 730. The audience measurement report 730 includes a listing of the stored types of online behavior data for the users within the second group that are associated with the stored target audience variables.

Each audience measurement report may include various different metrics that are useful in analyzing the online behavior data. For example, for those client systems in the projected universe of client systems that are associated with the stored target audience variables selected by the user, the audience measurement report 730 indicates that 154,538,000 systems within the projected US internet universe have visited the web entity "Yahoo! Sites" during the reporting period. Similarly, the audience measurement report 730 indicates that 140,957,000 systems within the projected US internet universe have visited the web entity "Facebook.com" during the same reporting period. Of the total number systems in the projected US internet universe of systems that are associated with the stored target audience variables selected by the user, the audience measurement report 730 indicates that 90.4% of the systems within the projected US internet universe have visited the web entity "Yahoo! Sites" during the reporting period, while only 82.4% have visited the web entity "Facebook.com." However, despite the fact that fewer total systems within the projected US internet universe visited it, the audience measurement report 730 indicates that the average total number of minutes that users interacted with the web entity "Facebook.com" during the reporting period was 55,945. On the other hand, the audience measurement report 730 indicates that the average total number of minutes that users interacted with the web entity "Yahoo! Sites" during the reporting period was only 35,874.

Thus, while more users within the target audience profile of the audience measurement report 730 may visit the web entity "Yahoo! Sites", those same users spend more total time visiting the web entity "Facebook.com" during the same period of time.

Though the audience measurement report 730 has been described as containing certain metrics based on the collected online behavior data, there are any number of other metrics that may be included in other audience measurement reports. For example, an audience measurement report may include an indication of the number of advertisements that were displayed to the visiting users on each of the web entities included in the report, as well as how many of those advertisements were selected by a user. Alternatively or additionally, an audience measurement report may include an indication of what parts of a web entity's various webpages on which the users tended to focus.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the techniques have been described. Nevertheless, it will be understood that various modifications may be made. For example, useful results still could be achieved if steps of the disclosed techniques were performed in a different order and/or if components in the disclosed systems were combined in a different manner and/or replaced or supplemented by other components.

Accordingly, other implementations are within the scope of the following claims.

What is claimed is:

1. A system, comprising:
   one or more processing devices; and
   one or more storage devices storing instructions that, when executed by the one or more processing devices, cause the one or more processing devices to:
   access a first data set associated with a first group of users, the first data set including demographic data, user behavior data, and additional user data associated with the users in the first group, the additional user data including data received from a survey presented on a user device by a beacon code, the user behavior data of the first data set including data received from monitoring applications executing on a first set of client systems associated with the first group of users;
   access a second data set associated with a second group of users, the second data set including demographic data and user behavior data but not additional user data associated with the users in the second group, the user behavior data of the second data set including data received from monitoring applications executing on a second set of client system associated with the second group of users;
   group users in the first group and users in the second group into one or more subsets based on the demographic data included in the first data set and the demographic data included in the second data set;
   create a multivariate data structure of user behavior data for each user from the first group grouped in a first subset and for each user from the second group grouped into the first subset;
   match a first user in the first group with a second user in the second group by:
      determining a similarity measurement between the multivariate data structure created for the second user and each of the multivariate data structures created for the users from the first group grouped in the first subset,
      determining that the similarity measurement between the multivariate data structure created for the first user and the multivariate data structure created for the second user indicates a greater similarity than the similarity measurements between the multivariate data structure created for the second user and the multivariate data structures created for the other users from the first group grouped in the first subset, and
      matching the first user with the second user in response to determining that the similarity measurement between the multivariate data structure created for the first user and the multivariate data structure created for the second user indicates a greater similarity than the similarity measurements between the multivariate data structure created for the second user and the other users from the first group grouped in the first subset;
   generate, based on matching the first user in the first group with the second user in the second group, an augmented second data set that includes additional user data associated with the second user in the second group; and generate one or more reports based on the augmented second data set.

2. The system of claim 1, wherein the instructions that, when executed by the one or more processing devices, cause the one or more processing devices to generate the one or more reports include instructions that, when executed by the one or more processing devices, cause the one or more processing devices to generate one or more reports based on the first data set and the augmented second data set.

3. The system of claim 1, wherein the instructions that, when executed by the one or more processing devices, cause the one or more processing devices to group users in the first group and users in the second group into one or more subsets include instructions that, when executed by the one or more processing devices, cause the one or more processing devices to:
compare demographic data included in the first data set and demographic data included in the second data set;
determine, based on the comparison between the demographic data included in the first data set and the demographic data included in the second data set, that demographic data associated with a first user in the first group matches demographic data associated with a second user in the second group; and
group the user in the first group and the user in the second group into a subset.

4. The system of claim 1, wherein the instructions that, when executed by the one or more processing devices, cause the one or more processing devices to determine a similarity measurement between the multivariate data structure created for the second user and each of the multivariate data structures created for the users from the first group grouped in the first subset include instructions that, when executed by the one or more processing devices, cause the one or more processing devices to determine a Mahalanobis distance between the multivariate data structure created for the second user and each of the multivariate data structures created for the users from the first group grouped in the first subset.

5. The system of claim 1, wherein the one or more storage devices store instructions that, when executed by the one or more processing devices, cause the one or more processing devices to further determine whether user behavior data included in the second data set associated with a user in the second group of users represents a threshold level of data for a reporting period necessary for inclusion of the user behavior data in the one or more generated reports.

6. The system of claim 1, wherein the monitoring applications executing on the first set of client systems and the monitoring applications executing on the second set of client systems are configured to monitor client system activity associated with web resource accesses by a client system.

7. The system of claim 6, wherein the monitoring applications executing on the first set of client systems and the monitoring applications executing on the second set of client systems are further configured to monitor at least one of: outgoing network traffic from a client system and associated with a web resource access, incoming network traffic to a client system and associated with a web resource access, a network location of an accessed web resource, or cookie data sent from a client system and associated with a web resource access.

8. The system of claim 1, wherein the data received from the survey presented on a user device by a beacon code is received via a beacon message caused by the beacon code.

9. A computer-implemented method, comprising:
accessing a first data set associated with a first group of users, the first data set including demographic data, user behavior data, and additional user data associated with the users in the first group, the additional user data including data received from a survey presented on a user device by a beacon code, the user behavior data of the first data set including data received from monitoring applications executing on a first set of client systems associated with the first group of users;
accessing a second data set associated with a second group of users, the second data set including demographic data and user behavior data but not additional user data associated with the users in the second group, the user behavior data of the second data set including data received from monitoring applications executing on a second set of client systems associated with the second group of users;
grouping users in the first group and users in the second group into one or more subsets based on the demographic data included in the first data set and the demographic data included in the second data set;
creating a multivariate data structure of user behavior data for each user from the first group grouped in a first subset and for each user from the second group grouped into the first subset;
matching a first user in the first group with a second user in the second group by:
determining a similarity measurement between the multivariate data structure created for the second user and each of the multivariate data structures created for the users from the first group grouped in the first subset,
determining that the similarity measurement between the multivariate data structure created for the first user and the multivariate data structure created for the second user indicates a greater similarity than the similarity measurements between the multivariate data structure created for the second user and the multivariate data structures created for the other users from the first group grouped in the first subset, and
matching the first user with the second user in response to determining that the similarity measurement between the multivariate data structure created for the first user and the multivariate data structure created for the second user indicates a greater similarity than the similarity measurements between the multivariate data structure created for the second user and the other users from the first group grouped in the first subset;
generating, based on matching the first user in the first group with the second user in the second group, an augmented second data set that includes additional user data associated with the second user in the second group; and
generating one or more reports based on the augmented second data set.

10. The method of claim 9, wherein generating the one or more reports includes generating one or more reports based on the first data set and the augmented second data set.

11. The method of claim 9, wherein grouping users in the first group and users in the second group into one or more subsets includes:
comparing demographic data included in the first data set and the demographic data included in the second data set;

determining, based on the comparison between the demographic data included in the first data set and the demographic data included in the second data set, that demographic data associated with a first user in the first group matches demographic data associated with a second user in the second group; and grouping the user in the first group and the user in the second group into a subset.

12. The method of claim 9, wherein determining a similarity measurement between the multivariate data structure created for the second user and each of the multivariate data structures created for the users from the first group grouped in the first subset includes determining a Mahalanobis distance between the multivariate data structure created for the second user and each of the multivariate data structures created for the users from the first group grouped in the first subset.

13. The method of claim 9, further comprising determining whether user behavior data included in the second data set associated with a user in the second group of users represents a threshold level of data for a reporting period necessary for inclusion of the user behavior data in the one or more generated reports.

14. The method of claim 9, wherein the monitoring applications executing on the first set of client systems and the monitoring applications executing on the second set of client systems are configured to monitor client system activity associated with web resource accesses by a client system.

15. The method of claim 9, wherein the data received from the survey presented on a user device by a beacon code is received via a beacon message caused by the beacon code.

16. A system, comprising:
one or more processing devices; and
one or more storage devices storing instructions that, when executed by the one or more processing devices, cause the one or more processing devices to:
access a first set of demographic data for a first group of client systems, the first set of demographic data being determined based on survey data collected from each member of the first group of client systems, the survey data being received from a survey presented on a user device by a beacon code;
access a second set of demographic data for a second group of client systems, the second set of demographic data being determined based on profile data associated with each member of the second group of client systems;
compare the first set of demographic data with the second set of demographic data;
based on the comparison of the first set of demographic data with the second set of demographic data, group, into subsets, one or more members of the first group of client systems with one or more members of the second group of client systems such that members of each subset share matching demographic data;
access user behavior data for each member of a subset, the user behavior data including data received from monitoring applications executing on client systems associated with members of a subset;
compare user behavior data of each member of the subset with user behavior data of other members of the subset by:
creating a multivariate data structure of user behavior data for each client system from the first group grouped in a first subset and for each client system from the second group grouped into the first subset, the first group grouped in the first subset including a first client system and the second group grouped in the first subset including a second client system,
determining a similarity measurement between the multivariate data structure created for the second client system and each of the multivariate data structures created for the client systems from the first group grouped in the first subset, and
determining that the similarity measurement between the multivariate data structure created for the first client system and the multivariate data structure created for the second client system indicates a greater similarity than the similarity measurement between the multivariate data structure created for the second client system and the other client systems from the first group grouped in the first subset;
based on the comparison of the user behavior data of each member of the first subset with user behavior data of the other members of the first subset, associate, within the first subset, each member of the second group of client systems with a member of the first group of client systems, wherein associating each member of the second group of client systems with a member of the first group of client systems includes matching the first client system with the second client system in response to determining that the similarity measurement between the multivariate data structure created for the first client system and the multivariate data structure created for the second client system indicates a greater similarity than the similarity measurements between the multivariate data structure created for the second client system and the other client systems from the first group grouped in the first subset;
for each member of the second group of client systems within the first subset, associate survey data collected from the member of the first group of client systems with the member of the second group of client systems with whom the member of the first group of client systems has been associated; and
generate one or more reports based on the association of survey data.

17. The system of claim 16, wherein:
the instructions that, when executed by the one or more processing devices, cause the one or more processing devices to compare the first set of demographic data with the second set of demographic data include instructions that, when executed by the one or more processing devices, cause the one or more processing devices to determine that the first client system from the first group of client systems share one or more of the following demographic variables with the second client system from the second group of client systems: age, gender, zip code, income, race, ethnicity, whether there are children present in a household associated with the client system, and the size of the household associated with the client system; and
the instructions that, when executed by the one or more processing devices, cause the one or more processing devices to group, into subsets, one or more members of the first group of client systems with one or more members of the second group of client systems such that members of each subset share matching demographic data include instructions that, when executed by the one or more processing devices, cause the one or more processing devices to group the first client system from the first group of client systems and the second client system from the second group of client systems into one of the subsets.

18. The system of claim 16, wherein the instructions that, when executed by the one or more processing devices, cause the one or more processing devices to generate one or more reports based on the association of survey data include instructions that, when executed by the one or more processing devices, cause the one or more processing devices to:
receive one or more target audience variables that are based on the survey data;
search data associated with the first group of client systems and the second group of client systems for the one or more target audience variables; and
generate a report that includes the user behavior data associated with the members of the first group of client systems and the members of the second group of client systems that are associated with survey data that matches the one or more target audience variables.

19. The system of claim 16, wherein the instructions that, when executed by the one or more processing devices, cause the one or more processing devices to associate, within the first subset, each member of the second group of client systems with a member of the first group of client systems include instructions that, when executed by the one or more processing devices, cause the one or more processing devices to:
determine the similarity measurements between each of the multivariate data structures created for the client systems from the second group grouped in the first subset and each of the multivariate data structures created for the client systems from the first group grouped in the first subset,
determine that the multivariate data structure created for a third client system from the first group grouped in the first subset is less similar than a multivariate data structure created for at least one other client system from the first group grouped in the first subset to each of the client systems from the second group grouped in the first subset,
determine a similarity measurement between the multivariate data structure created for the third client system and each of the multivariate data structures created for the client systems from the second group grouped in the first subset, and
determine that the similarity between the multivariate data structure created for the third client system and a multivariate data structure created for a fourth client system from the second group grouped in the first subset indicates a greater similarity than the similarity measurements between the multivariate data structure created for the third client system and the other client systems from the second group grouped in the first subset; and
the instructions that, when executed by the one or more processing devices, cause the one or more processing devices to associate, within the first subset, each member of the second group of client systems with a member of the first group of client systems includes instructions that, when executed by the one or more processing devices, cause the one or more processing devices to match the third client system with the fourth client system in response to determining that the similarity measurement between the multivariate data structure created for the third client system and the multivariate data structure created for the fourth client system indicates greater similarity than the similarity measurement between the multivariate data structure created for the third client system and the other client systems from the second group grouped in the first subset.

20. The system of claim 16, wherein the one or more storage devices store instructions that, when executed by the one or more processing devices, cause the one or more processing devices to further determine whether user behavior data included in the second data set associated with a user in the second group of client systems represents a threshold level of data for a reporting period necessary for inclusion of the user behavior data in the one or more generated reports.

* * * * *